United States Patent
Kakinuma et al.

(10) Patent No.: US 11,900,423 B2
(45) Date of Patent: Feb. 13, 2024

(54) IMAGE RETRIEVAL APPARATUS IMAGE RETRIEVAL METHOD, PRODUCT CATALOG GENERATION SYSTEM, AND RECORDING MEDIUM

(71) Applicant: RICOH COMPANY, LTD., Tokyo (JP)

(72) Inventors: Akihiro Kakinuma, Kanagawa (JP); Tomoyasu Aizaki, Kanagawa (JP); Naohiro Kamijo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 692 days.

(21) Appl. No.: 17/045,080

(22) PCT Filed: May 21, 2019

(86) PCT No.: PCT/JP2019/020108
§ 371 (c)(1),
(2) Date: Oct. 2, 2020

(87) PCT Pub. No.: WO2019/230499
PCT Pub. Date: Dec. 5, 2019

(65) Prior Publication Data
US 2021/0150590 A1    May 20, 2021

(30) Foreign Application Priority Data
May 28, 2018   (JP) .................. 2018-101852

(51) Int. Cl.
*G06Q 30/02* (2023.01)
*G06Q 30/0601* (2023.01)
*G06T 7/00* (2017.01)

(52) U.S. Cl.
CPC ..... *G06Q 30/0278* (2013.01); *G06Q 30/0603* (2013.01); *G06Q 30/0643* (2013.01); *G06T 7/0002* (2013.01)

(58) Field of Classification Search
CPC ................. G06T 7/0002; G06N 3/08
See application file for complete search history.

(56) References Cited

U.S. PATENT DOCUMENTS

2004/0054752 A1   3/2004   Takagi et al.
2005/0039123 A1*  2/2005   Kuchinsky ............... G16B 5/30
                                                    715/740

(Continued)

FOREIGN PATENT DOCUMENTS

CN    105989043 A    10/2016
JP    2002-288482 A  10/2002

(Continued)

OTHER PUBLICATIONS

International Search Report and Written Opinion dated Aug. 8, 2019 in PCT/JP2019/020108 filed on May 21, 2019.

(Continued)

*Primary Examiner* — Manuchehr Rahmjoo
(74) *Attorney, Agent, or Firm* — XSENSUS LLP

(57) ABSTRACT

An image retrieval apparatus acquires an image to be processed, the image to be processed including at least one article. The image retrieval apparatus specifies, as an association image, a product image of a product having an evaluation value that has a predetermined relationship with an evaluation value of the article included in the image to be processed, from among product images of a plurality of products each belonging to a particular category, the particular category being different from a category to which the article included in the image to be processed belongs. The image to be processed and the specified association image may be output in association with each other.

13 Claims, 43 Drawing Sheets

(56) References Cited

U.S. PATENT DOCUMENTS

| | | |
|---|---|---|
| 2009/0037295 A1 | 2/2009 | Saul et al. |
| 2012/0116917 A1 | 5/2012 | Saul et al. |
| 2012/0259701 A1 | 10/2012 | Kumazawa et al. |
| 2012/0265774 A1 | 10/2012 | Saul et al. |
| 2013/0063723 A1 | 3/2013 | Shimbo et al. |
| 2017/0364992 A1 | 12/2017 | Noguchi |

FOREIGN PATENT DOCUMENTS

| | | |
|---|---|---|
| JP | 2008-204184 A | 9/2008 |
| JP | 2012-014544 A | 1/2012 |
| JP | 2013-077215 A | 4/2013 |
| JP | 2016-015164 A | 1/2016 |
| JP | 2016-181196 A | 10/2016 |
| KR | 10-2017-0096971 A | 8/2017 |
| WO | WO 2017/142361 A1 | 8/2017 |

OTHER PUBLICATIONS

Office Action dated Apr. 12, 2022 in Japanese Patent Application No. 2018-101852, 6 pages.
Office Action dated Oct. 26, 2023 in Chinese Patent Application No. 201980032597.9, 9 pages.

\* cited by examiner

FIG. 6

FIRST LEARNING INFORMATION (LARGE CLASSIFICATION: LOWER GARMENT)
FIRST LEARNING INFORMATION (LARGE CLASSIFICATION: UPPER GARMENT, AND SMALL CLASSIFICATION: JACKET)
FIRST LEARNING INFORMATION (LARGE CLASSIFICATION: UPPER GARMENT, AND SMALL CLASSIFICATION: SHIRT)   600

| IMAGE ID | PAST IMAGE | INDEX | | | | |
|---|---|---|---|---|---|---|
| | | TARGET (MIND) | FASHION CONSCIOUSNESS (TASTE) | OCCASION | APPEARANCE | THEME |
| ID001 | | TEENS | CONTEMPORARY | TOWN CASUAL | COUNTRY | TREND |
| ID002 | | YOUNG | CONTEMPORARY | CITY CASUAL | ELEGANT | TREND |
| ID003 | | YOUNG ADULT | CONSERVATIVE | RESORT | COUNTRY | SEASONALITY |

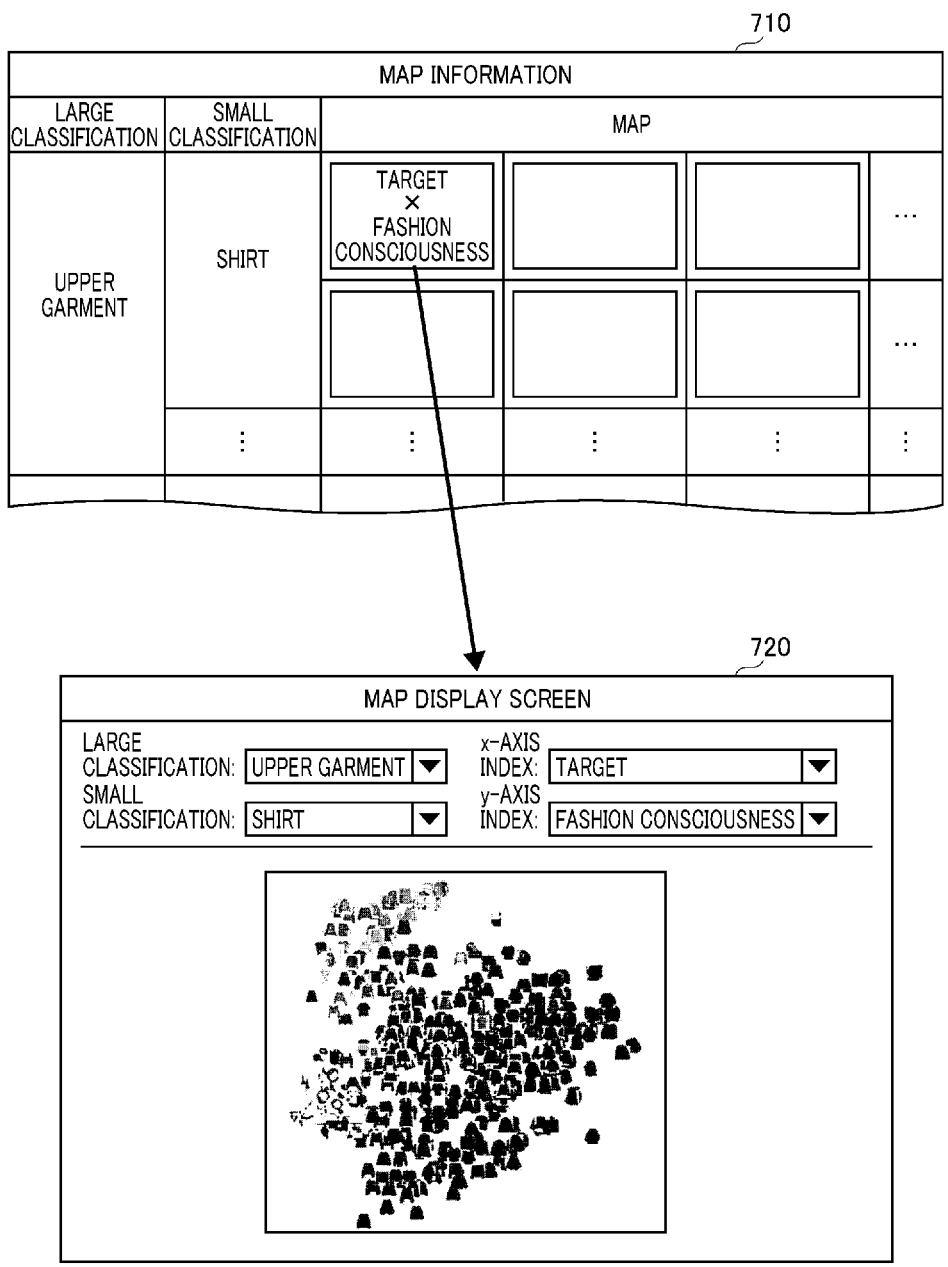

FIG. 8
| IMAGE ID | SECOND LEARNING INFORMATION (SINGLE) | | | | |
|---|---|---|---|---|---|
| | REFERENCE IMAGE | CATEGORY | | | |
| | | HAT | UPPER GARMENT | LOWER GARMENT | ... |
| ID-S001 |  | - | F | F | ... |
| ID-S002 |  | - | F | F | ... |
| ID-S003 |  | - | F | F | ... |

FIG. 9

| IMAGE ID | SECOND LEARNING INFORMATION (MULTIPLE) ||||| 
| | REFERENCE IMAGE | CATEGORY ||||
| | | HAT | UPPER GARMENT | LOWER GARMENT | ... |
| ID-S501 | | – | F | F | ... |
| | | – | M | M | ... |
| ID-S502 | | – | M | M | ... |
| | | – | F | F | ... |
| ID-S503 | | – | F | F | ... |
| | | – | F | F | ... |
| | | | | | |

| IMAGE ID | PRODUCT IMAGE | INDEX | | | | |
|---|---|---|---|---|---|---|
| | | TARGET (MIND) | FASHION CONSCIOUSNESS (TASTE) | OCCASION | APPEARANCE | THEME |
| ID-P001 | | | | | | |
| ID-P002 | | | | | | |
| ID-P003 | | | | | | |

PRODUCT IMAGE INFORMATION (LARGE CLASSIFICATION: UPPER GARMENT, AND SMALL CLASSIFICATION: SHIRT)
PRODUCT IMAGE INFORMATION (LARGE CLASSIFICATION: UPPER GARMENT, AND SMALL CLASSIFICATION: JACKET)
PRODUCT IMAGE INFORMATION (LARGE CLASSIFICATION: LOWER GARMENT)

1000

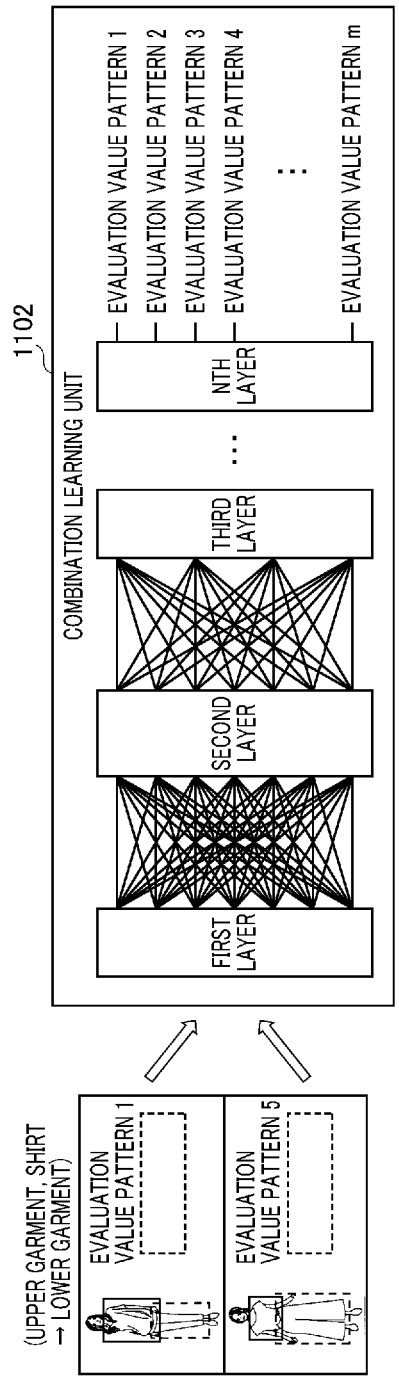

IMAGE RETRIEVAL APPARATUS IMAGE RETRIEVAL METHOD, PRODUCT CATALOG GENERATION SYSTEM, AND RECORDING MEDIUM

TECHNICAL FIELD

The present invention relates to an image retrieval apparatus, an image retrieval method, a product catalog generation system, and a recording medium.

BACKGROUND ART

The recent system recommends products optimal for customers. For example, in a calculation method described in Patent Document 1, the relationship between the product data and the attribute data of a user is learned in advance, and the attribute data of a new user is input to a learning result to calculate the degree of conformity with each product data. By using this calculation method, it is possible to recommend products according to the degree of conformity.

CITATION LIST

Patent Literature

PTL 1: JP 2016-181196 A

SUMMARY OF INVENTION

Technical Problem

However, according to Patent Document 1, in a case where a user purchases products of a plurality of categories (upper garment, lower garment, shoes, hats, and the like), the products are recommended for each category. On the other hand, products recommended individually for each category may not necessarily be the appropriate combination.

The present invention has been made in view of the above-described drawback, and it is an object of the present invention to make it possible to recommend products that can be appropriately combined, when recommending products in different categories.

Solution to Problem

Example embodiments of the present invention include an image retrieval apparatus, which acquires an image to be processed, the image to be processed including at least one article. The image retrieval apparatus specifies, as an association image, a product image of a product having an evaluation value that has a predetermined relationship with an evaluation value of the article included in the image to be processed, from among product images of a plurality of products each belonging to a particular category, the particular category being different from a category to which the article included in the image to be processed belongs. The image to be processed and the specified association image may be output in association with each other.

In one example, the predetermined relationship indicates that the evaluation value of the product image and the evaluation value of the article included in the image to be processed are optimally combinable. For example, as described below, the predetermined relationship may be represented by an evaluation value pattern.

Advantageous Effects of Invention

In accordance with embodiments of the present invention, when recommending products in different categories, it is possible to recommend products that can be appropriately combined.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 6 is a view illustrating an example of first learning information.

FIG. 7 is a view illustrating an example of processing of a map generation unit.

FIG. 8 is a view illustrating an example of second learning information.

FIG. 9 is a view illustrating an example of the second learning information.

FIG. 10 is a view illustrating an example of product image information.

FIGS. 13A and 13B are diagrams each illustrating an example of processing of a combination learning unit.

DESCRIPTION OF EMBODIMENTS

Figure 1:
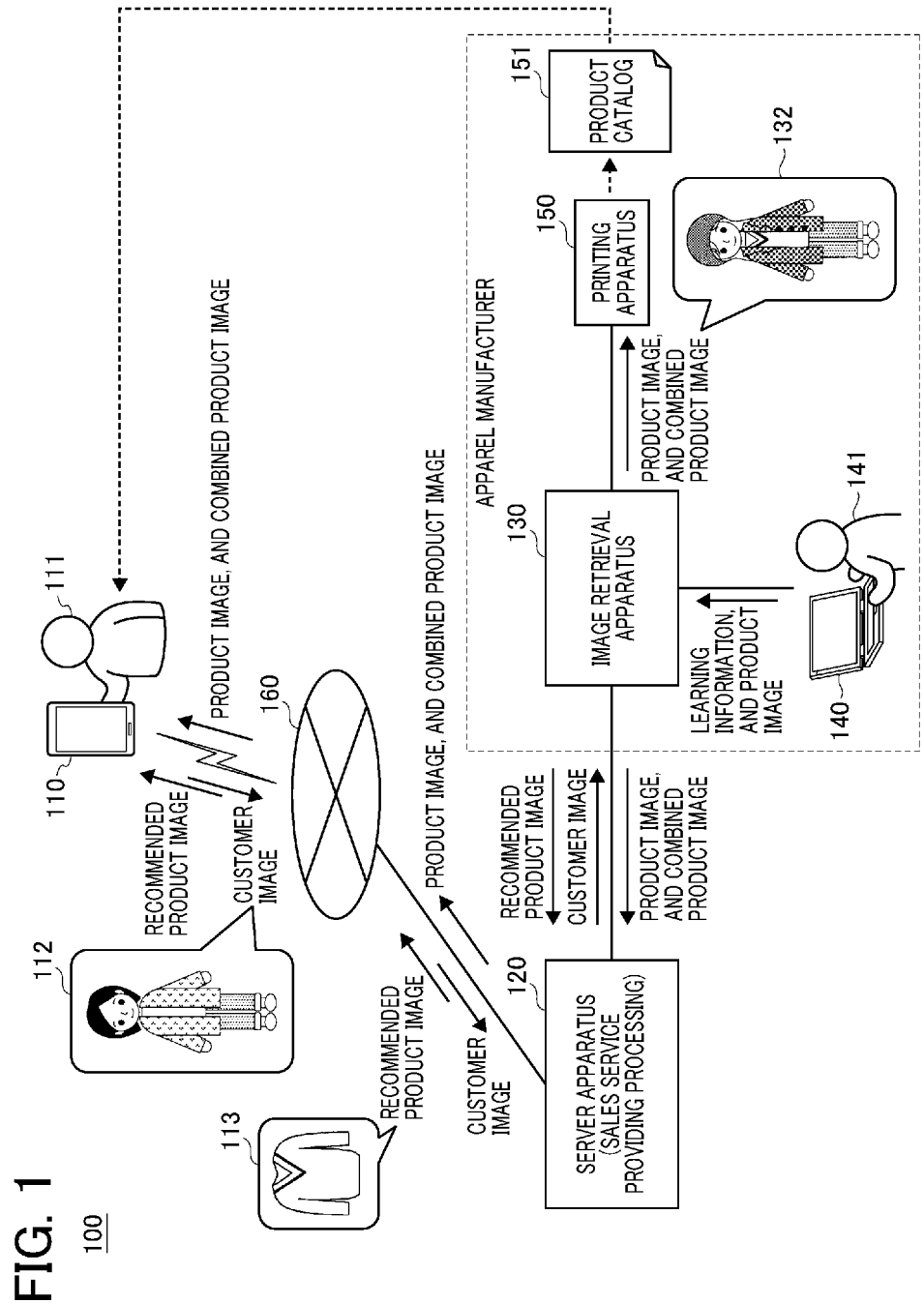
FIG. 1 is a diagram illustrating an example of a system configuration of a sales system having an image retrieval apparatus according to a first embodiment.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, each embodiment will be described in detail. In the description and drawings of each embodiment, components having substantially the same functional configuration are denoted by the same reference numerals, and redundant descriptions are omitted.

First Embodiment

<System Configuration of Sales System>

First, a system configuration of a sales system having an image retrieval apparatus according to a first embodiment will be described. FIG. 1 is a diagram illustrating an example of the system configuration of the sales system having the image retrieval apparatus according to the first embodiment.

As illustrated in FIG. 1, a sales system 100 includes a mobile terminal 110 possessed by a customer 111, a server apparatus 120 for providing a sales service of a product, an image retrieval apparatus 130, a terminal 140 possessed by a seller 141, and a printing apparatus 150.

The mobile terminal 110 accesses the server apparatus 120 via the network 160, and executes purchase processing of a product desired by the customer 111 via a sales service provided by the server apparatus 120. In executing the purchase processing, the mobile terminal 110 receives a "product image" and a "combined product image" from the server apparatus 120, and displays the "product image" and the "combined product image". The "product image" refers to a photographed image obtained by photographing a product currently sold by an apparel manufacturer. The "combined product image" refers to a photographed image obtained by photographing a fashion model wearing products determined to be an optimal combination among products currently sold by an apparel manufacturer. The customer 111 selects a product image while referring to the displayed combined product image, to instruct the purchase of a desired product.

Furthermore, the mobile terminal 110 can transmit a "customer image" to the server apparatus 120 when the customer 111 selects a product image. The "customer image" refers to, for example, to an image photographed by a customer and input by the customer in order to receive a recommendation service. Alternatively, the "customer image" may be an image (however, it is assumed that the server apparatus 120 can acquire and handle the image) uploaded to a cloud service or a social networking service (SNS), each may be implemented by a cloud server. The mobile terminal 110 can receive and display a product image including a product (sweater in the example in FIG. 1) determined to be an optimal combination for an article (for example, a coat worn by the customer 111) included in a customer image 112 as a recommended product image 113.

As a result, the customer 111 can select a product image after recognizing a product (sweater) that is optimal for combination with an article (coat) that the customer has.

The server apparatus 120 provides a product image and a combined product image to the mobile terminal 110 in response to an access from the mobile terminal 110. The server apparatus 120 acquires the product image and the combined product image to be provided to the mobile terminal 110 from the image retrieval apparatus 130.

When receiving the customer image 112 transmitted from the mobile terminal 110, the server apparatus 120 transmits the customer image 112 to the image retrieval apparatus 130, and receives the recommended product image from the image retrieval apparatus 130. The server apparatus 120 transmits the received recommended product image to the mobile terminal 110.

The image retrieval apparatus 130 receives the input of learning information and a product image from the terminal 140. The "learning Information" is information used when learning a relationship between an evaluation value of an article belonging to a predetermined category and an evaluation value of an article belonging to another category, and the details will be described later. The "evaluation value" is a value or information given to each article based on an index indicating an impression of the article. The "category" is a classification for classifying articles, and as described later, includes a category in which only large classification is defined, and a category in which a large classification and a small classification are defined. Even if a large classification and a small classification are the same, for example, an article for adults and an article for children are to be classified into different categories.

On the basis of the relationship learned using the learning information, the image retrieval apparatus 130 identifies a product belonging to another category, the product being optimal for combination with a product belonging to a predetermined category. Accordingly, for example, the image retrieval apparatus 130 generates the combined product image 132. The image retrieval apparatus 130 transmits the product image and the combined product image to the server apparatus 120 and the printing apparatus 150.

The terminal 140 receives learning information input by the seller 141 and transmits the information to the image retrieval apparatus 130. The terminal 140 receives a product image input by the seller 141 and transmits the product image to the image retrieval apparatus 130. Furthermore, the terminal 140 receives various instructions input by the seller 141 and notifies the image retrieval apparatus 130 of the instructions.

The printing apparatus 150 generates and prints a product catalog 151 including the product image and the combined product image transmitted from the image retrieval apparatus 130. In an example illustrated in FIG. 1, the printing apparatus 150 owned by an apparel manufacturer is used for printing the product catalog 151. However, a printing apparatus owned by a manufacturer other than an apparel manufacturer may be used. For example, a printing apparatus owned by a printing company may be used, or a printing apparatus installed in a convenience store or the like may be used.

The product catalog 151 printed by the printing apparatus 150 is delivered to the customer 111, for example. Although the example in FIG. 1 illustrates that the delivery is performed by an apparel manufacturer, the delivery to the customer 111 may be entrusted to a manufacturer other than an apparel manufacturer (such as a printing company or another delivery company). However, when the customer 111 prints the product catalog 151 by using a printing apparatus installed in a convenience store or the like, the delivery of the product catalog 151 is not required.

<Sales System Processing Flow for Each Phase>

Figure 2:
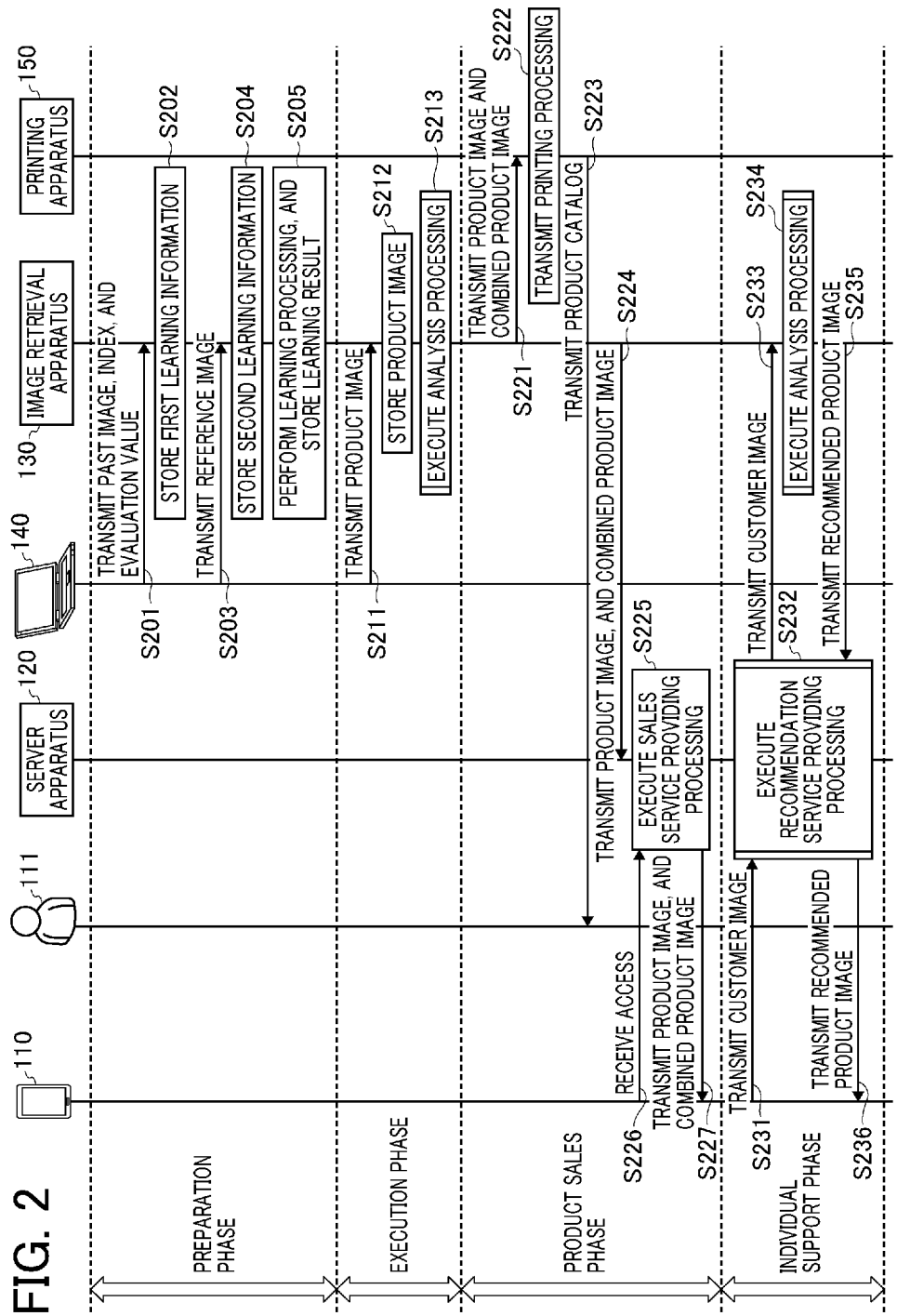
FIG. 2 is a sequence diagram illustrating a flow of processing for each phase in the sales system.

Next, processing flow for each phase in the sales system 100 will be described. FIG. 2 is a sequence diagram illustrating the processing flow for each phase in the sales system. As illustrated in FIG. 2, the processing in the sales system 100 can be broadly divided into a "preparation phase", an "execution phase", a "product sales phase", and an "individual support phase".

The preparation phase is a phase in which learning information used for learning by the image retrieval apparatus 130 is collected and learned. As illustrated in FIG. 2, in step S201, the terminal 140 transmits, to the image retrieval apparatus 130, a past image and an index and evaluation value indicating the impression of each product included in the past image, as learning information. The "past image" is a photographed image obtained by photographing a product sold by an apparel manufacturer in the past. It is assumed that an evaluation value for each index has been defined for the product sold in the past, and the terminal 140 transmits, to the image retrieval apparatus 130, the evaluation value for each index already defined, in association with the past image.

Among the products sold in the past, for a product in which the evaluation value for each index is not defined, the seller 141 determines and inputs an evaluation value when inputting a past image.

In step S202, the image retrieval apparatus 130 stores the past image, index and evaluation value transmitted from the terminal 140, as first learning information.

In step S203, the terminal 140 transmits a reference image to the image retrieval apparatus 130 as learning information. The "reference image" refers to, for example, a photographed image obtained by photographing a fashion model wearing a product of another apparel manufacturer (famous brand). The reference image may include, for example, any image indicating an optimal combination of articles, such as an image retrieved by the seller 141 on the network 160, or an image obtained by scanning a fashion magazine.

In step S204, the image retrieval apparatus 130 stores the reference image transmitted from the terminal 140 as second learning information.

In step S205, the image retrieval apparatus 130 executes learning processing using the first learning information, and stores a learning result (evaluation value learning result). The image retrieval apparatus 130 executes the learning processing using the first learning information, to learn a relationship between the past image and the evaluation value. The image retrieval apparatus 130 executes learning processing using second learning information, and stores a learning result (combination learning result). The image retrieval apparatus 130 executes the learning processing using the second learning information, to learn a relationship of evaluation values among optimally combinable articles, the articles each belonging to a different category (first category, and second category).

The execution phase is a phase for executing the learning result (evaluation value learning result, and combination learning result) in the preparation phase. As illustrated in FIG. 2, in step S211, the terminal 140 transmits the product image to the image retrieval apparatus 130. In step S212, the image retrieval apparatus 130 stores the product image transmitted from the terminal 140.

In step S213, the image retrieval apparatus 130 executes analysis processing. Specifically, the image retrieval apparatus 130 calculates an evaluation value of a product included in each product image on the basis of the evaluation value learning result obtained by learning the relationship between the past image and the evaluation value. Furthermore, the image retrieval apparatus 130 specifies a product image for products that are each in a different category and can be optimally combined, on the basis of a combination learning result obtained by learning the relationship of evaluation values among optimally combinable articles, and generates a combined product image. The details of the analysis processing (step S213) will be described later.

The product sales phase is a phase for executing processing for selling a product. As illustrated in FIG. 2, in step S221, the image retrieval apparatus 130 transmits the acquired product image and the generated combined product image to the printing apparatus 150.

In step S222, the printing apparatus 150 generates the product catalog 151 including the product image and the combined product image, and in step S223, transmits the product catalog 151 to the customer 111.

In step S224, the image retrieval apparatus 130 transmits the acquired product image and the generated combined product image to the server apparatus 120.

In step S225, the server apparatus 120 executes sales service providing processing. Specifically, when receiving an access from the mobile terminal 110 in step S226, the server apparatus 120 transmits the product image and the combined product image to the mobile terminal 110 in step S227.

As a result, the customer 111 can browse the product image and the combined product image through the mobile terminal 110, and can instruct the purchase of a desired product. A description of the processing of the mobile terminal 110 and the server apparatus 120 after the purchase instruction is omitted.

The individual support phase is a phase for supporting individual requests for each customer when selling products. As illustrated in FIG. 2, in step S231, the mobile terminal 110 transmits the customer image 112 to the server apparatus 120. In step S232, the server apparatus 120 executes recommendation service providing processing. The recommendation service providing processing is processing for providing the recommended product image 113 for the customer image 112 to the customer 111.

In step S233, the server apparatus 120 transmits the received customer image 112 to the image retrieval apparatus 130. In step S234, the image retrieval apparatus 130 executes analysis processing. Specifically, the image retrieval apparatus 130 calculates an evaluation value of an article included in the customer image 112 on the basis of the evaluation value learning result obtained by learning the relationship between the past image and the evaluation value. Furthermore, the image retrieval apparatus 130 specifies a product image for a product that can be optimally combined for the article included in the customer image 112, on the basis of a combination learning result obtained by learning the relationship of evaluation values among optimally combinable articles.

In step S235, the image retrieval apparatus 120 transmits, to the server apparatus 130, the product image for the product that can be optimally combined for the article included in the customer image 112, as the recommended product image 113. In step S236, the server apparatus 120 transmits the received recommended product image 113 to the mobile terminal 110.

Thus, the customer 111 can select a product image after recognizing a product that is optimal for combination with the article included in the customer image 112.

<Hardware Configuration of Server Apparatus and Image Retrieval Apparatus>

Next, the hardware configuration of the server apparatus 120 and the image retrieval apparatus 130 will be described. Since the hardware configuration of the server apparatus 120 is substantially the same as the hardware configuration of the image retrieval apparatus 130, the hardware configuration of the image retrieval apparatus 130 will be described below.

Figure 3:
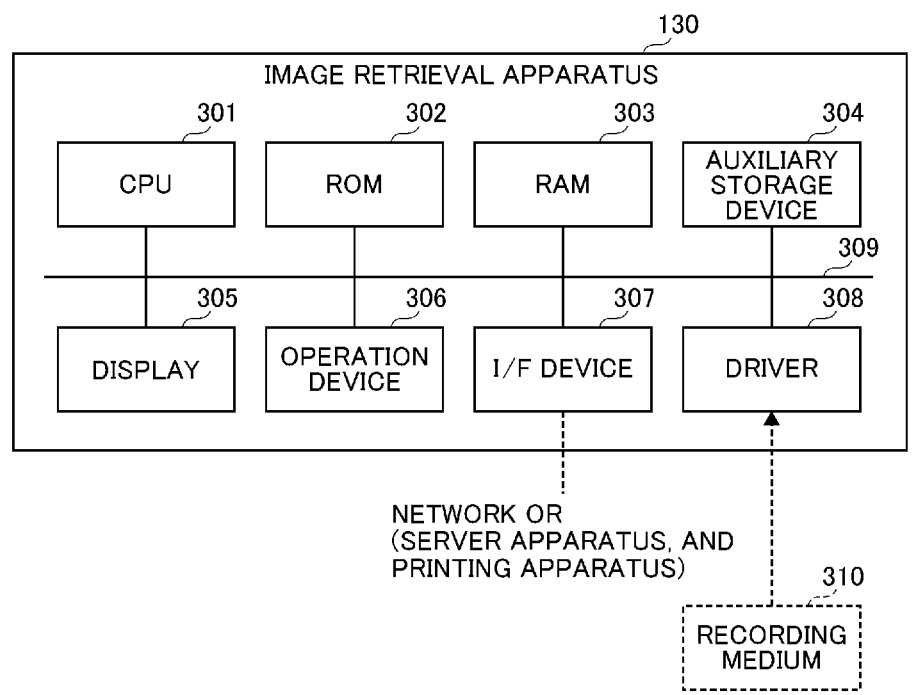
FIG. 3 is a diagram illustrating an example of a hardware configuration of the image retrieval apparatus.

FIG. 3 is a diagram illustrating an example of the hardware configuration of the image retrieval apparatus. As illustrated in FIG. 3, the image retrieval apparatus 130 includes a central processing unit (CPU) 301, a read only memory (ROM) 302, and a random access memory (RAM) 303. The CPU 301, the ROM 302, and the RAM 303 form a so-called computer.

The image retrieval apparatus 130 includes an auxiliary storage device 304, a display 305, an operation device 306, an I/F (interface) device 307, and a driver 308. The hardware of the image retrieval apparatus 130 are connected to each other via a bus 309.

The CPU 301 is a computing device that executes various programs (for example, an image retrieval program or the like) installed in the auxiliary storage device 304.

The ROM 302 is a nonvolatile memory. The ROM 302 functions as a main storage device that stores various programs, data, and the like used for the CPU 301 to execute various programs installed in the auxiliary storage device 304. Specifically, the ROM 302 functions as a main storage device that stores boot programs such as a basic input/output system (BIOS) or an extensible firmware interface (EFI).

The RAM 303 is a volatile memory such as a dynamic random access memory (DRAM) or a static random access memory (SRAM). The RAM 303 functions as a main storage device that provides a work area used for expanding various programs stored in the auxiliary storage device 304 for execution by the CPU 301.

The auxiliary storage device 304 is an auxiliary storage device that stores various programs and information used when the various programs are executed.

The display 305 is any desired display that displays information such as the internal state of the image retrieval apparatus 130. The operation device 306 is an input device used for inputting various instructions to the image retrieval apparatus 130.

The I/F device 307 is a connection device for establishing a connection to the network 160, the server apparatus 120, or the printing apparatus 150.

The driver 308 is a device for setting a recording medium 310. The recording medium 310 includes a medium that optically, electrically or magnetically stores information, such as a CD-ROM, a flexible disk, or a magneto-optical disk. The recording medium 310 may also include a semiconductor memory or the like that electrically stores information, such as a ROM or a flash memory.

The distributed recording medium 310 is set in the driver 308 and various programs recorded in the recording medium 310 are read by the driver 308, so that the various programs to be installed in the auxiliary storage device 304 are installed, for example. Alternatively, various programs to be installed in the auxiliary storage device 304 may be installed by being downloaded from the network 160 via the I/F device 307.

<Details of Functional Configuration of Image Retrieval Apparatus>

Figure 4:
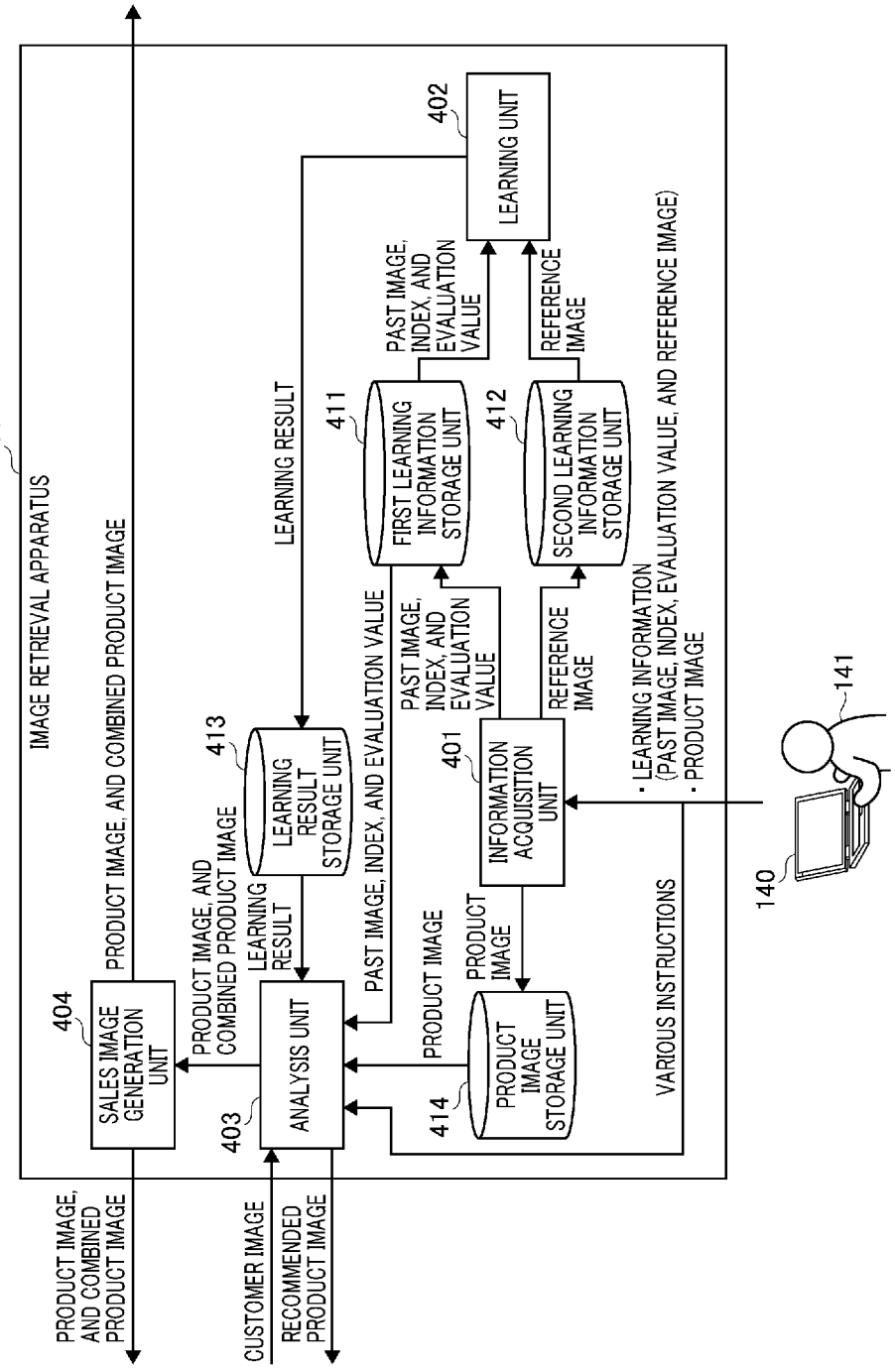
FIG. 4 is a diagram illustrating an example of a functional configuration of the image retrieval apparatus.

Next, a functional configuration of the image retrieval apparatus 130 will be described. FIG. 4 is a diagram illustrating an example of the functional configuration of the image retrieval apparatus. As described above, an image retrieval program is installed in the image retrieval apparatus 130. When the program is executed, the image retrieval apparatus 130 functions as an information acquisition unit 401, a learning unit 402, an analysis unit 403, and a sales image generation unit 404 (see FIG. 4).

The information acquisition unit 401 receives pieces of learning information (past image, index and evaluation value, and reference image) and a product image from the terminal 140. The information acquisition unit 401 stores the past image, index and evaluation value among the pieces of acquired learning information, as first learning information in a first learning information storage unit 411.

The information acquisition unit 401 stores the reference image among the pieces of acquired learning information, in a second learning information storage unit 412 as second learning information. Further, the information acquisition unit 401 stores the acquired product image in a product image storage unit 414.

The learning unit 402 reads the past image, index and evaluation value from the first learning information storage unit 411, learns a relationship between the past image and the evaluation value, and stores an evaluation value learning result in a learning result storage unit 413. The learning unit 402 reads the reference image from the second learning information storage unit 412, learns a relationship of evaluation values among articles that belong to different categories and can be optimally combined, and stores a combination learning result in the learning result storage unit 413.

In the execution phase, the analysis unit 403 operates on the basis of various instructions from the terminal 140. Specifically, the analysis unit 403 reads the product image from the product image storage unit 414 and calculates the evaluation value of the product included in the product image by inputting the product image to the evaluation value learning result. The analysis unit 403 plots and displays the product image at a position corresponding to the calculated evaluation value on a map (details will be described later) generated on the basis of the past image.

Further, the analysis unit 403 uses the learning result in the execution phase and the individual support phase to specify an "association image" for an "image to be processed". The "image to be processed" refers to a product image selected by the seller 141 from product images to generate a combined product image, or refers to a customer image input by the customer 111 to receive a recommendation service. The "association image" refers to a product image specified for an image to be processed, the product image of a product being in a different category of a product determined to be an optimal combination for an article included in the image to be processed.

For example, when a product image is selected as an image to be processed by the seller 141 in the execution phase, the analysis unit 403 calculates an evaluation value for the product included in the selected product image and specifies an association image by inputting the evaluation value to the combination learning result. Then, the analysis unit 403 acquires a combined product image generated on the basis of the selected product image and the association image, and notifies the sales image generation unit 404 of the combined product image. Note that, when the analysis unit 403 notifies the sales image generation unit 404 of the combined product images, the analysis unit 403 reads all the product images stored in the product image storage unit 414 and also notifies the sales image generation unit 404 of all the product images.

When the analysis unit 403 receives the customer image 112 transmitted from the server apparatus 120 as the image to be processed in the individual support phase, the analysis unit 403 calculates an evaluation value for the customer image 112 and specifies the association image by inputting the evaluation value to the combination learning result. Then, the analysis unit 403 transmits the specified association image to the server apparatus 120 as a recommended product image.

The sales image generation unit 404 generates a sales image using the product image and the combined product image notified from the analysis unit 403. Specifically, the sales image generation unit 404 generates a sales image for generating a product catalog including the product image and the combined product image, and transmits the image to the printing apparatus 150. Furthermore, the sales image generation unit 404 generates a sales image for generating a sales service screen including the product image and the combined product image, and transmits the image to the server apparatus 120.

<Details of Processing of Each Unit of Image Retrieval Apparatus>

Next, the processing of each unit (information acquisition unit 401, learning unit 402, analysis unit 403, and sales image generation unit 404) of the image retrieval apparatus 130 will be described in detail.

<Details of Processing of Information Acquisition Unit>

Figure 5:
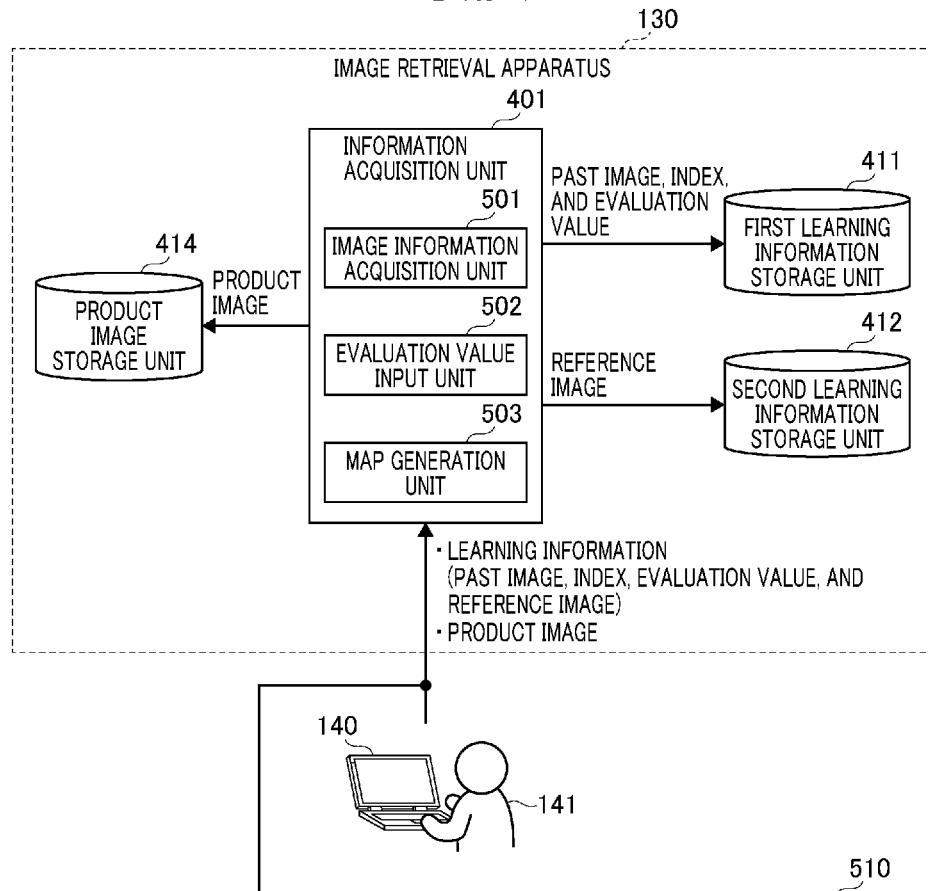
FIG. 5 is a diagram illustrating the details of a functional configuration of an information acquisition unit of the image retrieval apparatus.

(1) Details of Functional Configuration of Information Acquisition Unit First, a functional configuration of the information acquisition unit 401 of the image retrieval apparatus 130 will be described in detail. FIG. 5 is a diagram illustrating the details of the functional configuration of the information acquisition unit of the image retrieval apparatus. As illustrated in FIG. 5, the information acquisition unit 401 includes an image information acquisition unit 501, an evaluation value input unit 502, and a map generation unit 503.

The image information acquisition unit 501 stores the past image transmitted from the terminal 140 in the first learning information storage unit 411. The image information acquisition unit 501 stores the reference image transmitted from the terminal 140 in the second learning information storage unit 412.

The evaluation value input unit 502 stores the index and evaluation value associated with the past image in association with the past image, in the first learning information storage unit 411. Examples of evaluation values for each index stored in association with the past image are illustrated in an evaluation value table 510.

The evaluation value table 510 includes five indices of "Target", "Fashion consciousness", "Occasion", "Appearance", and "Theme", and an evaluation value is defined for each of the indices. For example, in the case of an index="Target", "Teens", "Young", "Young adult", "Mature", and "Senior" are defined as evaluation values.

The map generation unit 503 generates a map by plotting each past image stored in the first learning information storage unit 411 on a two-dimensional plane defined by predetermined two-axis indices.

(2) Example of First Learning Information

Next, an example of first learning information stored in the first learning information storage unit 411 will be described. FIG. 6 is a view illustrating an example of the first learning information. As illustrated in FIG. 6, first learning information 600 is managed separately for each of the large classification and the small classification. At the forefront of FIG. 6, the first learning information in which past images of a large classification="Upper garment" and a small classification="Shirt", indices, and the evaluation values are stored are illustrated.

As illustrated in the forefront of FIG. 6, the first learning information 600 includes "Image ID", "Past image", and "Index" as items of information. "Image ID" is an identifier for identifying the associated past image. The "Past image" is information regarding the past image, such as an image representing the past image. "Index" includes five indices ("Target", "Fashion consciousness", "Occasion", "Appearance", and "Theme"), and an evaluation value for each of the indices is stored.

(3) Example of Map

Next, an example of the map generated by the map generation unit 503 in the preparation phase will be described. FIG. 7 is a view illustrating an example of processing of a map generation unit. As illustrated in FIG. 7, the map generation unit 503 divides the past images stored in the first learning information 600 into the large classification and the small classification, and generates a map by plotting each of the past images at a position based on the evaluation value on a two-dimensional plane defined by predetermined two-axis indices. The map generation unit 503 stores each of the generated maps as map information 710.

A map display screen 720 of FIG. 7 illustrates, as the map information 710, a map generated by plotting past images belonging to a large classification="Upper garment" and a small classification="Shirt" at positions based on evaluation values on a two-dimensional plane defined by an x-axis index="Target" and a y-axis index="Fashion consciousness".

It is assumed that the seller 141 can browse an arbitrary map included in the map information 710 held by the map generation unit 503 via the display 305 or the terminal 140 of the image retrieval apparatus 130.

Specifically, it is assumed that the seller 141 can display an arbitrary map included in the map information 710 by designating a large classification, a small classification, an x-axis index, and a y-axis index on the map display screen 720.

(4) First Example of Second Learning Information

Next, a first example of second learning information stored in the second learning information storage unit 412 will be described. FIG. 8 is a view illustrating an example of the second learning information. As illustrated in FIG. 8, second learning information 800 includes "Image ID", "Reference image", and "Category" as items of information.

"Image ID" is an identifier for identifying an associated reference image. The "Reference image" is information regarding the reference image, such as an image representing the reference image. In FIG. 8, the reference image in the second learning information 800 is a reference image in a case where there is one subject (single). The items of information stored as "Category" are further classified by article, such as a "Hat", "Upper garment", "Lower garment", and the like.

Specifically, the "Category" information indicates whether or not a specific article is associated with the reference image, for each of such specific article such as "Hat", "Upper garment", "Lower garment", and the like. For example, in case the reference image identified by an image ID "ID-S001" includes articles upper garment and lower garment, the "Upper garment" and "Lower garment" fields each indicate that such article is associated with the image ID "ID-S001" (or present in such image). Further, in FIG. 8, "F" indicates that the article is for female, and "M" indicates that the article is for male.

(5) Second Example of Second Learning Information

Next, a second example of second learning information stored in the second learning information storage unit 412 will be described. FIG. 9 is a view illustrating an example of the second learning information. As illustrated in FIG. 9, the second learning information 900 includes "Image ID", "Reference image", and "Category" as items of information.

"Image ID" is an identifier for identifying an associated reference image. The "Reference image" is information regarding the reference image, such as an image representing the reference image. In FIG. 9, the reference image in the second learning information 900 is a reference image in a case where there are two subjects (multiple). The items of information stored as "Category" are further classified by article, such as a "Hat", "Upper garment", "Lower garment", and the like.

Specifically, the "Category" information indicates whether or not a specific article is associated with the reference image, for each of such specific article such as "Hat", "Upper garment", "Lower garment", and the like. For example, in case the reference image identified by the image ID="ID-S501" includes articles upper garment and lower garment, the "Upper garment" and "Lower garment" fields each indicate that such article is associated with the image ID "ID-S501" (or present in such image). Still referring to FIG. 9, the upper part in the "category" field stores information indicating whether or not an article for adults is included, and the lower part of the "category" field stores information indicating whether or not an article for children is included. Further, in FIG. 9, "F" indicates that the article is for female, and "M" indicates that the article is for male.

(6) Example of Product Image Information

Next, an example of product image information stored in the product image storage unit 414 will be described. FIG. 10 is a view illustrating an example of the product image information. As illustrated in FIG. 10, product image information 1000 is managed separately for each of a large classification and a small classification. At the forefront of FIG. 10, product image information in which product images of a large classification="Upper garment" and a small classification="Shirt" are stored is illustrated.

As illustrated in the forefront of FIG. 10, the product image information 1000 includes "Image ID", "Product image", and "Index" as items of information. The "Image ID" is an identifier for identifying the associated product image. The "Product image" is information regarding a product image, such as an image representing a product. The "Index" includes five indices ("target", "Fashion consciousness", "Occasion", "Appearance", and "Theme"). Since the evaluation value of each index of the product image information 1000 is calculated by the analysis unit 403 using the evaluation value learning result, the evaluation value is not stored when the product image is stored in the product image storage unit 414.

<Details of Processing of Learning Unit>

(1) Details of Functional Configuration of Learning Unit

Figure 11:
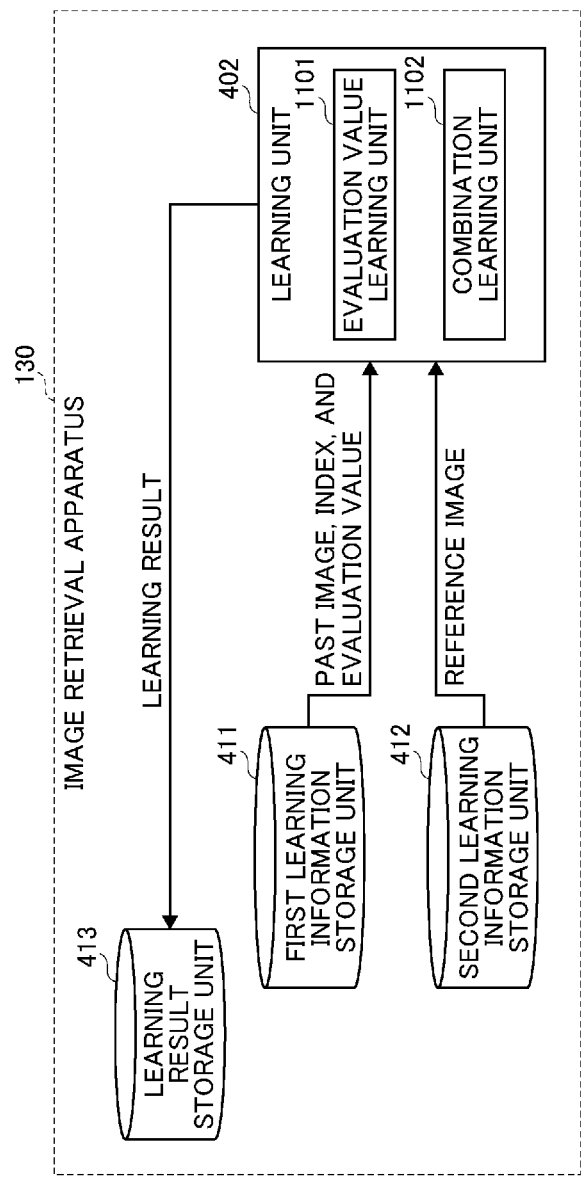
FIG. 11 is a diagram illustrating the details of a functional configuration of the learning unit of the image retrieval apparatus.

Next, a functional configuration of the learning unit 402 of the image retrieval apparatus 130 will be described. FIG. 11 is a diagram illustrating the details of a functional configuration of the learning unit of the image retrieval apparatus. As illustrated in FIG. 11, the learning unit 402 further includes an evaluation value learning unit 1101 and a combination learning unit 1102.

The evaluation value learning unit 1101 reads the past image, the index, and the evaluation value that are stored in the first learning information storage unit 411, and learns a relationship between the past image and the evaluation value. The evaluation value learning unit 1101 stores the evaluation value learning result obtained by learning the relationship between the past image and the evaluation value in the learning result storage unit 413.

The combination learning unit 1102 reads the reference image stored in the second learning information storage unit 412, and acquires an evaluation value for each article included in the reference image. The combination learning unit 1102 inputs an image of each article included in the reference image to the evaluation value learning result, to acquire an evaluation value of each article included in the reference image.

The combination learning unit 1102 uses the evaluation value of each of the articles included in the reference image to learn a relationship of evaluation values among optimally combinable articles. The combination learning unit 1102 stores, in the learning result storage unit 413, the combination learning result obtained by learning the relationship of the evaluation values among the optimally combinable articles.

(2) Example of Processing of Evaluation Value Learning Unit

Figure 12A:
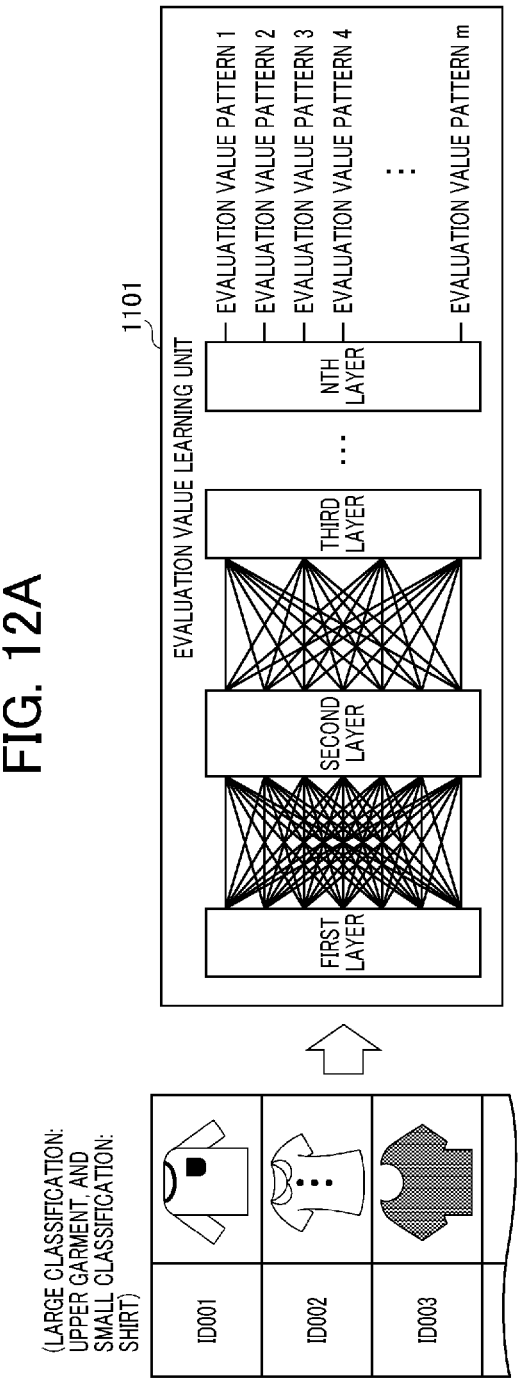
FIGS. 12A and 12B are diagrams each illustrating an example of processing of an evaluation value learning unit.
Figure 12B:
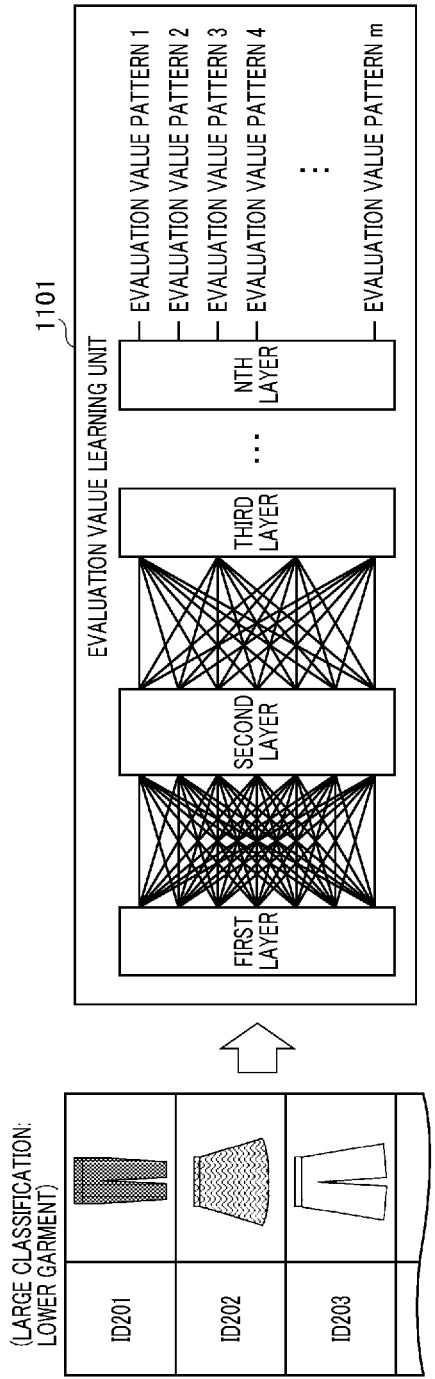

Next, an example of processing of the evaluation value learning unit 1101 will be described. FIGS. 12A and 12B are diagrams each illustrating the specific example of the processing of the evaluation value learning unit. As illustrated in FIGS. 12A and 12B, the evaluation value learning unit 1101 divides the past images into the large classification and the small classification, learns a relationship between the past images and evaluation values for each of the large classification and the small classification, and obtains an evaluation value learning result. The evaluation value learning unit 1101 is implemented by, for example, a convolutional neural network.

FIG. 12A illustrates how the evaluation value learning unit 1101 learns the relationship between past images and evaluation values for a large classification="Upper garment" and a small classification="Shirt". The past image of a product belonging to the large classification="Upper garment" and the small classification="Shirt" of the past image is input to the evaluation value learning unit 1101.

As illustrated in FIG. 12A, an evaluation value pattern 1 to an evaluation value pattern m are defined as a combination of evaluation values (referred to as an evaluation value pattern), in the output of the evaluation value learning unit 1101. "Evaluation value pattern 1" refers, for example, to a combination of a target="Teens", a fashion consciousness="Contemporary", an occasion="Town casual", an appearance="Country", and a theme="Trend". Furthermore, "Evaluation value pattern 2" refers, for example, to a combination of a target="Young", a fashion consciousness="Contemporary", an occasion="City casual", an appearance="Elegance", and a theme="Trend".

The evaluation value learning unit 1101 performs learning so that, for example, when a past image of image ID="ID001" is input, the certainty of "Evaluation value pattern 1" is equal to or greater than a predetermined threshold value. The evaluation value learning unit 1101 performs learning so that, for example, when a past image of image ID="ID002" is input, the certainty of "Evaluation value pattern 2" is equal to or greater than a predetermined threshold value.

Similarly, FIG. 12B illustrates how the evaluation value learning unit 1101 learns the relationship between past images and evaluation values for a large classification="Lower garment". The past image of a product belonging to the large classification="Lower garment" of the past image is input to the evaluation value learning unit 1101. In FIG. 12B, as in FIG. 12A, an evaluation value pattern 1 to an evaluation value pattern m are defined as the output of the evaluation value learning unit 1101.

As in FIG. 12A, also in FIG. 12B, the evaluation value learning unit 1101 performs learning so that the certainty of the evaluation value patterns associated with the input past images is equal to or greater than a predetermined threshold value.

In this way, the evaluation value learning unit 1101 obtains the evaluation value learning results for each of the large classification and the small classification.

(3) First Example of Processing of Combination Learning Unit

Figure 13A:
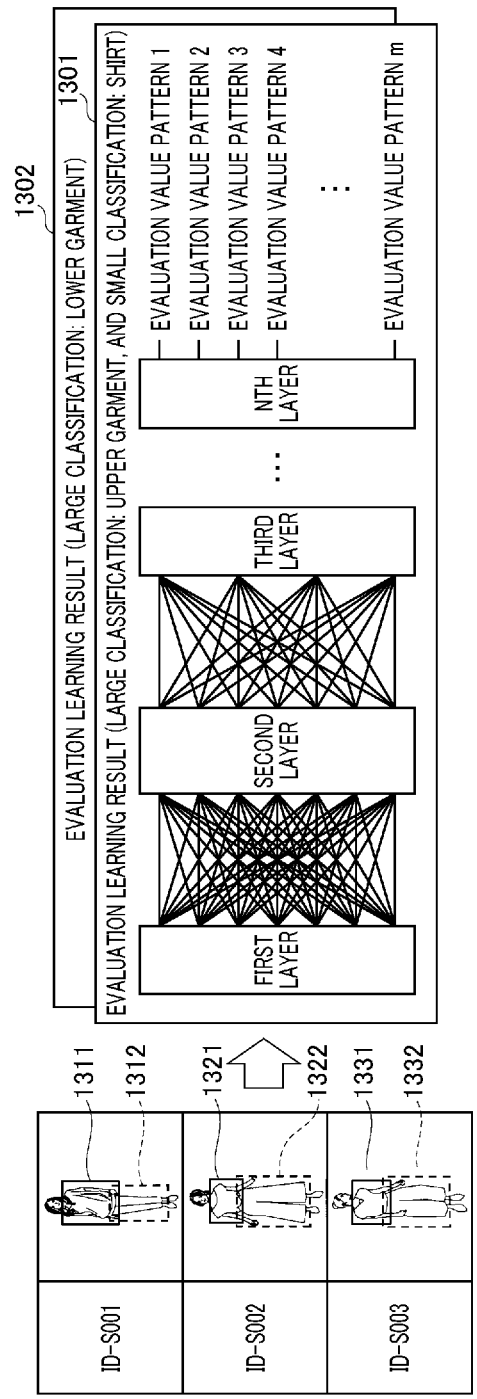

Next, a first example of processing of the combination learning unit 1102 will be described. FIGS. 13A and 13B are diagrams each illustrating the specific example of processing of a combination learning unit. As described above, the combination learning unit 1102 first acquires an evaluation value by inputting the image of each article included in the reference image to the evaluation value learning result.

The example in FIG. 13B illustrates how the combination learning unit 1102 learns the relationship between evaluation values in the combination of a large classification="Upper garment", a small classification="Shirt" and a large classification="Lower garment".

As illustrated in FIG. 13A, the combination learning unit 1102 first inputs images of articles (upper garment, and shirt) included in the reference image to the evaluation value learning result 1301 learned about the large classification="Upper garment" and the small classification="Shirt". The combination learning unit 1102 inputs an image of an article (Lower garment) included in the reference image to the evaluation value learning result 1302 learned about the large classification="Lower garment".

Specifically, the combination learning unit 1102 inputs a shirt image 1311 included in the reference image having the image ID="ID-S001" to the evaluation value learning result 1301, and obtains, for example, an evaluation value pattern 1. Furthermore, the combination learning unit 1102 inputs a lower garment image 1312 included in the reference image having the image ID="ID-S001" to the evaluation value learning result 1302, and obtains, for example, an evaluation value pattern 3.

Similarly, the combination learning unit 1102 inputs shirt images 1321, and 1331 included in the reference image having an image ID="ID-S002", and an image ID="ID-S003" to the evaluation value learning result 1301, and obtains, for example, an evaluation value pattern 5 and an evaluation value pattern 7. Furthermore, the combination learning unit 1102 inputs lower garment images 1322 and 1332 included in the reference image having the image ID="ID-S002", and the image ID="ID-S003" to the evaluation value learning result 1302, and obtains, for example, an evaluation value pattern 4 and the evaluation value pattern 5.

As described above, the combination learning unit 1102 uses the evaluation value of each of the articles included in the reference image to learn a relationship of evaluation values among optimally combinable articles. Therefore, as illustrated in FIG. 13B, when the "evaluation value pattern 1" of the shirt image 1311 is input, the combination learning unit 1102 performs learning so that the certainty of the "evaluation value pattern 3" of the associated lower garment image 1312 is equal to or greater than a predetermined threshold value. Furthermore, when the "evaluation value pattern 5" of the shirt image 1321 is input, the combination learning unit 1102 performs learning so that the certainty of the "evaluation value pattern 4" of the associated lower garment image 1322 is equal to or greater than a predetermined threshold value.

Furthermore, when the "evaluation value pattern 7" of the shirt image 1331 is input, the combination learning unit 1102 performs learning so that the certainty of the "evaluation value pattern 4" of the associated lower garment image 1332 is equal to or greater than a predetermined threshold value.

As described above, the combination learning unit 1102 obtains a combination learning result between articles in different categories (large classification and small classification).

(4) Relationship of Evaluation Values Among Optimally Combinable Articles

Next, a relationship of evaluation values among optimally combinable articles will be described according to this example. The relationship is indicated by the combination learning result learned by the combination learning unit 1102. FIGS. 14A to 14D are diagrams schematically illustrating a relationship of evaluation values among optimally combinable articles. In FIGS. 14A to 14D, for simplification of explanation, the relationship of evaluation values among the optimally combinable articles will be described by taking a two-dimensional plane defined by two specific indexes in a multi-dimensional index space as an example.

Figure 14A:
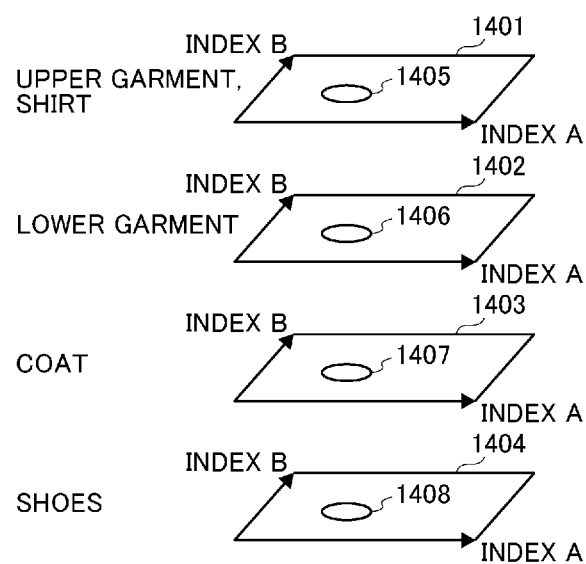
FIGS. 14A to 14D are diagrams each schematically illustrating a relationship of evaluation values among optimally combinable articles.

FIG. 14A illustrates an example in which the relationship of evaluation values among the optimally combinable articles has a similar relationship in two-dimensional planes 1401 to 1404 for each of the large classification and the small classification. The two-dimensional planes 1401 to 1404 are each defined by an index A and an index B.

FIG. 14A illustrates that, for example, a shirt having an evaluation value 1405 is combined with a lower garment having a similar evaluation value 1406 to obtain an optimum combination. Furthermore, FIG. 14A illustrates that an optimum combination can be obtained by combining a coat having a similar evaluation value 1407. Furthermore, FIG. 14A illustrates that an optimum combination can be obtained by combining shoes having a similar evaluation value 1408.

Figure 14B:
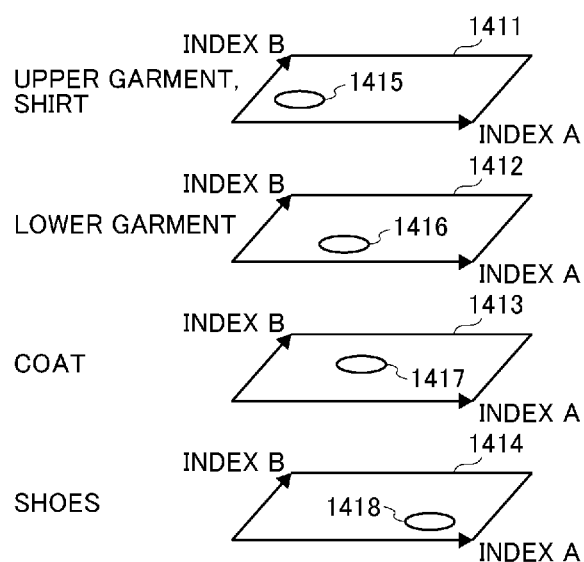

On the other hand, FIG. 14B illustrates an example in which the relationship of evaluation values among the optimally combinable articles has a dissimilar relationship in two-dimensional planes 1411 to 1414 for each of the large classification and the small classification. The two-dimensional planes 1411 to 1414 are each defined by the index A and the index B.

FIG. 14B illustrates that, for example, a shirt having an evaluation value 1415 is combined with a lower garment having a dissimilar evaluation value 1416 to obtain an optimum combination. Furthermore, FIG. 14B illustrates that an optimum combination can be obtained by combining a coat having a dissimilar evaluation value 1417. Furthermore, FIG. 14B illustrates that an optimum combination can be obtained by combining shoes having a dissimilar evaluation value 1418.

Figure 14C:
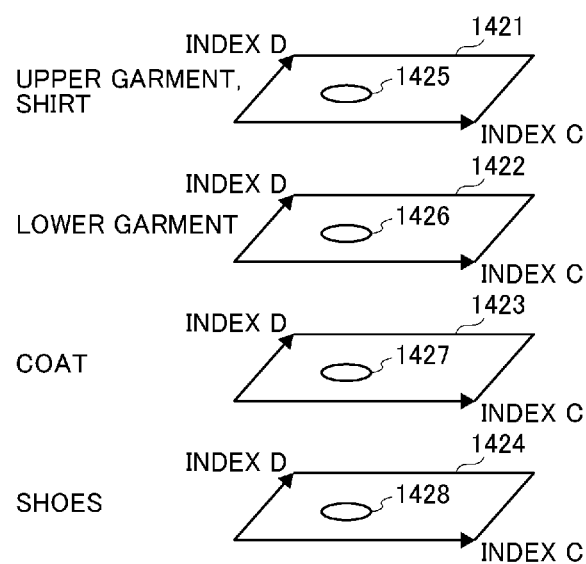

Furthermore, FIG. 14C illustrates an example in which the relationship of evaluation values among the optimally combinable articles has a similar relationship in the two-dimensional planes 1421 to 1424 for each of the large classification and the small classification. The two-dimensional planes 1421 to 1424 are each defined by an index C and an index D.

FIG. 14C illustrates that, for example, a shirt having an evaluation value 1425 is combined with a lower garment having a similar evaluation value 1426 to obtain an optimum combination. Furthermore, FIG. 14C illustrates that an optimum combination can be obtained by combining a coat having a similar evaluation value 1427. Furthermore, FIG. 14C illustrates that an optimum combination can be obtained by combining shoes having a similar evaluation value 1428.

Figure 14D:
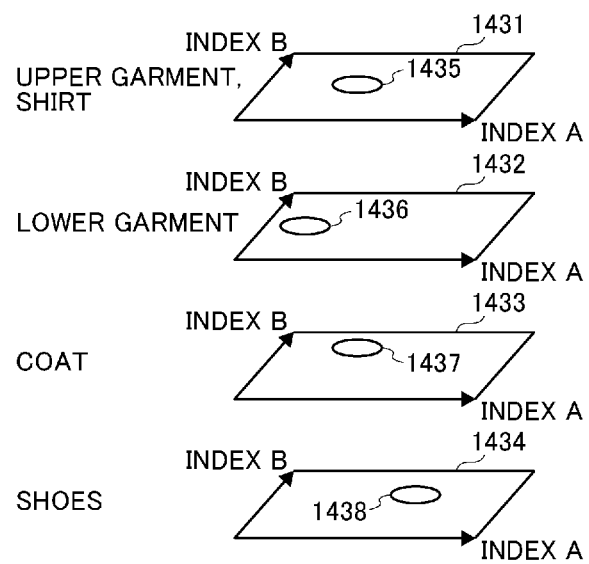

Furthermore, FIG. 14D illustrates an example in which the relationship of evaluation values among the optimally combinable articles has a dissimilar relationship in two-dimensional planes 1431 to 1434 for each of the large classification and the small classification, the two-dimensional planes 1431 to 1434 being defined by the index C and the index D.

FIG. 14D illustrates that, for example, a shirt having an evaluation value 1435 is combined with a lower garment having a dissimilar evaluation value 1436 to obtain an optimum combination. Furthermore, FIG. 14D illustrates that an optimum combination can be obtained by combining a coat having a dissimilar evaluation value 1437. Furthermore, FIG. 14B illustrates that an optimum combination can be obtained by combining shoes having a dissimilar evaluation value 1438.

(5) Second Example of Processing of Combination Learning Unit

Figure 15A:
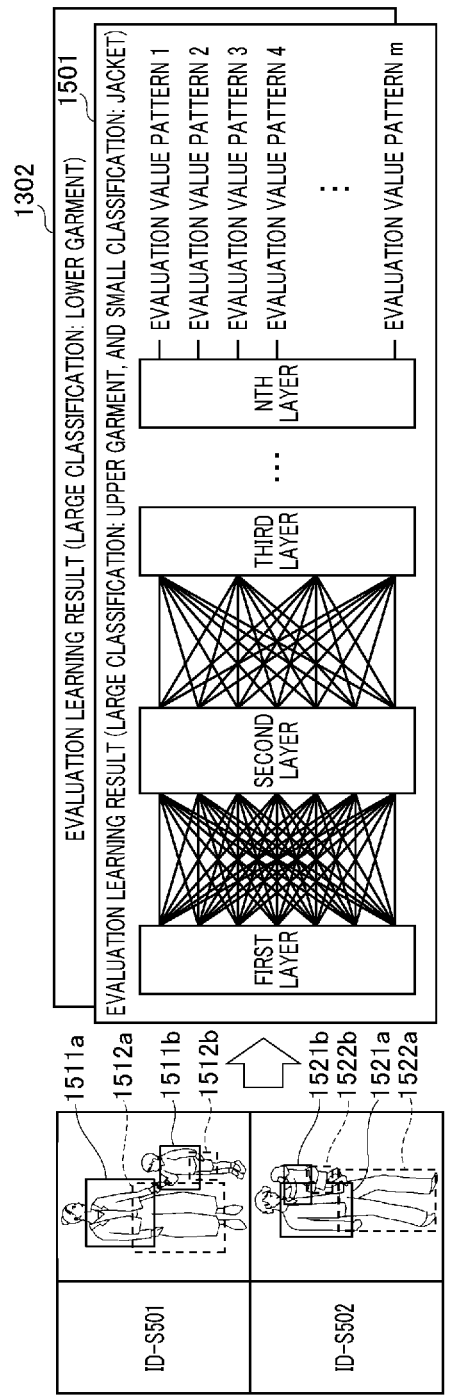
FIGS. 15A and 15B are diagrams each illustrating an example of processing of a combination learning unit.
Figure 15B:
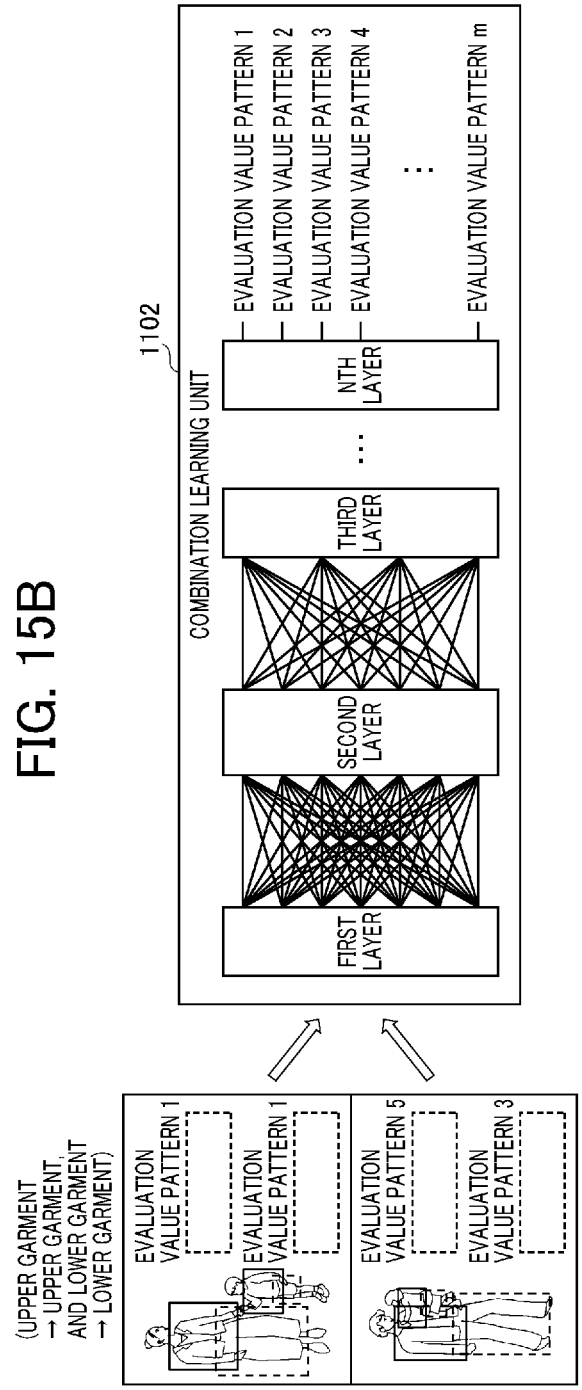

Next, a second example of processing of the combination learning unit 1102 will be described. FIGS. 15A and 15B are diagrams each illustrating the specific example of processing of a combination learning unit. FIGS. 13A and 13B each illustrate a case where learning is performed using a reference image in a case where there is one subject (single). However, FIGS. 15A and 15B each illustrate a case where learning is performed using a reference image in a case where there are two subjects (multiple).

As described above, the combination learning unit 1102 acquires an evaluation value by inputting the image of each article included in the reference image to the evaluation value learning result.

The example in FIG. 15B illustrates how the combination learning unit 1102 learns: a relationship of evaluation values in the combination of a large classification="Upper garment" and a small classification="Jacket", and a large classification="Upper garment" and a small classification="Jacket"; and a relationship of evaluation values in the combination of a large classification="Lower garment", and a large classification="Lower garment".

Then, as illustrated in FIG. 15A, the combination learning unit 1102 first inputs images of articles (upper garment, and jacket) included in the reference image to the evaluation value learning result 1501 learned about the large classification="Upper garment" and the small classification="Jacket". The combination learning unit 1102 inputs an image of an article (Lower garment) included in the reference image to the evaluation value learning result 1302 learned about the large classification="Lower garment".

Specifically, the combination learning unit 1102 inputs a jacket image 1511a included in the reference image having the image ID="ID-S501" to the evaluation value learning result 1501, and obtains, for example, an evaluation value pattern 1. Furthermore, the combination learning unit 1102 inputs a jacket image 1511b included in the reference image having the image ID="ID-S501" to the evaluation value learning result 1501, and obtains, for example, an evaluation value pattern 2. Furthermore, the combination learning unit 1102 inputs a lower garment image 1512a included in the reference image having the image ID="ID-S501" to the evaluation value learning result 1302, and obtains, for example, an evaluation value pattern 1. Furthermore, the combination learning unit 1102 inputs a lower garment image 1512b included in the reference image having the image ID="ID-S501" to the evaluation value learning result 1302, and obtains, for example, an evaluation value pattern 3.

Similarly, the combination learning unit 1102 inputs a jacket image 1521a included in the reference image having the image ID="ID-S502" to the evaluation value learning result 1501, and obtains, for example, an evaluation value pattern 5. Furthermore, the combination learning unit 1102 inputs a jacket image 1521b included in the reference image having the image ID="ID-S502" to the evaluation value learning result 1501, and obtains, for example, an evaluation value pattern 2. Furthermore, the combination learning unit 1102 inputs a lower garment image 1522a included in the reference image having the image ID="ID-S502" to the evaluation value learning result 1302, and obtains, for example, an evaluation value pattern 3. Furthermore, the combination learning unit 1102 inputs a lower garment image 1522b included in the reference image having the image ID="ID-S502" to the evaluation value learning result 1302, and obtains, for example, an evaluation value pattern 3.

Furthermore, as illustrated in FIG. 15B, when the "evaluation value pattern 1" of the shirt image 1511a is input, the combination learning unit 1102 performs learning so that the certainty of the "evaluation value pattern 2" of the associated jacket image 1511b is equal to or greater than a predetermined threshold value. Furthermore, when the "evaluation value pattern 5" of the shirt image 1521a is input, the combination learning unit 1102 performs learning so that the certainty of the "evaluation value pattern 2" of the associated jacket image 1521b is equal to or greater than a predetermined threshold value.

Similarly, when the "evaluation value pattern 1" of the lower garment image 1512a is input, the combination learning unit 1102 performs learning so that the certainty of the "evaluation value pattern 3" of the associated lower garment image 1512b is equal to or greater than a predetermined threshold value. Furthermore, when the "evaluation value pattern 3" of the lower garment image 1522a is input, the combination learning unit 1102 performs learning so that the certainty of the "evaluation value pattern 3" of the associated lower garment image 1522b is equal to or greater than a predetermined threshold value.

As described above, the combination learning unit 1102 obtains a combination learning result between articles in different categories (for adults, and for children).

(6) Relationship of Evaluation Values Among Optimally Combinable Articles

Next, a relationship of evaluation values among optimally combinable articles will be described according to an example. The relationship is indicated by the combination learning result learned by the combination learning unit 1102. FIGS. 16A to 16F are diagrams each schematically illustrating a relationship of evaluation values among optimally combinable articles.

Figure 16A:
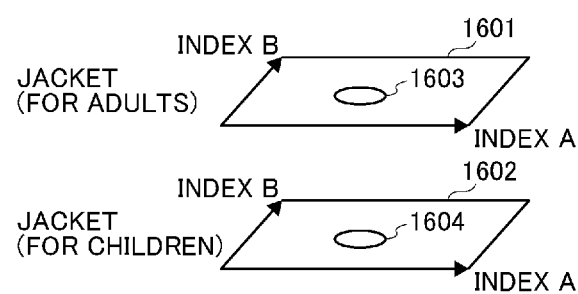
FIGS. 16A to 16F are diagrams each schematically illustrating a relationship of evaluation values among optimally combinable articles.

FIG. 16A illustrates an example in which the relationship of evaluation values among the optimally combinable articles has a similar relationship in a two-dimensional plane 1601 for adults and a two-dimensional plane 1602 for children. The two-dimensional planes 1601 and 1602 are each defined by the index A and the index B.

FIG. 16A illustrates that, for example, a jacket (for adults) having an evaluation value 1603 is combined with a jacket (for children) having a similar evaluation value 1604 to obtain an optimum combination.

Figure 16B:
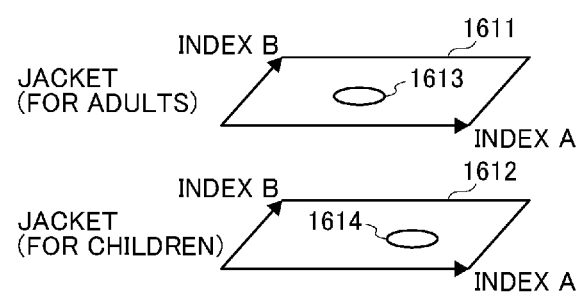

On the other hand, FIG. 16B illustrates an example in which the relationship of evaluation values among the optimally combinable articles has a dissimilar relationship in a two-dimensional plane 1611 for adults and a two-dimensional plane 1612 for children. The two-dimensional planes 1611 and 1612 are each defined by the index A and the index B.

FIG. 16B illustrates that, for example, a jacket (for adults) having an evaluation value 1613 is combined with a jacket (for children) having a dissimilar evaluation value 1614 to obtain an optimum combination.

Figure 16C:
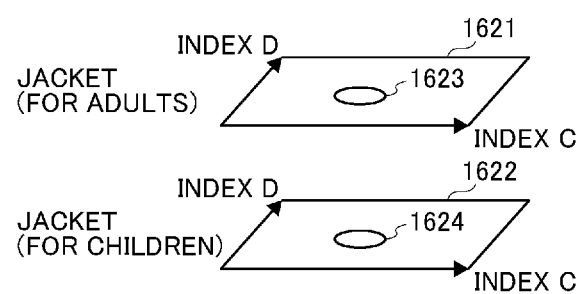

Furthermore, FIG. 16C illustrates an example in which the relationship of evaluation values among the optimally combinable articles has a similar relationship in a two-dimensional plane 1621 for adults and a two-dimensional plane 1622 for children. The two-dimensional planes 1621 and 1622 are each defined by the index C and the index D.

FIG. 16C illustrates that, for example, a jacket (for adults) having an evaluation value 1623 is combined with a jacket (for children) having a similar evaluation value 1624 to obtain an optimum combination.

Figure 16D:
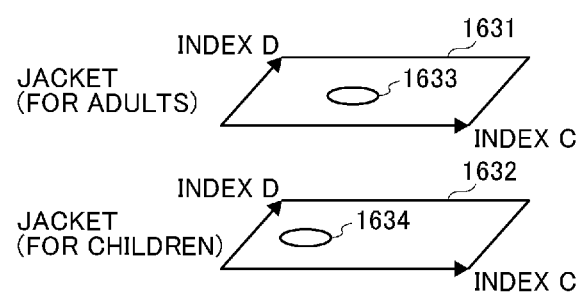

Furthermore, FIG. 16D illustrates an example in which the relationship of evaluation values among the optimally combinable articles has a dissimilar relationship in a two-dimensional plane 1631 for adults and a two-dimensional plane 1632 for children. The two-dimensional planes 1631 and 1632 are each defined by the index C and the index D.

FIG. 16D illustrates that, for example, a jacket (for adults) having an evaluation value 1633 is combined with a jacket (for children) having a dissimilar evaluation value 1634 to obtain an optimum combination.

Figure 16E:
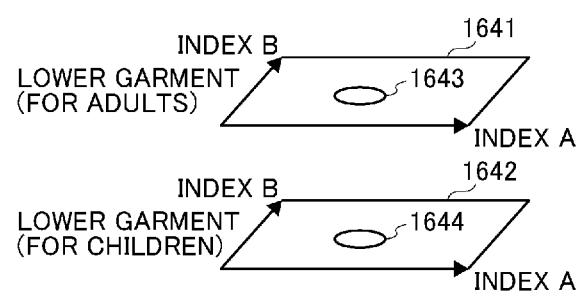

FIG. 16E illustrates an example in which the relationship of evaluation values among the optimally combinable articles has a similar relationship in a two-dimensional plane 1641 for adults and a two-dimensional plane 1642 for children. The two-dimensional planes 1641 and 1642 are each defined by the index A and the index B.

FIG. 16E illustrates that, for example, a lower garment (for adults) having an evaluation value 1643 is combined with a lower garment (for children) having a similar evaluation value 1644 to obtain an optimum combination.

Figure 16F:
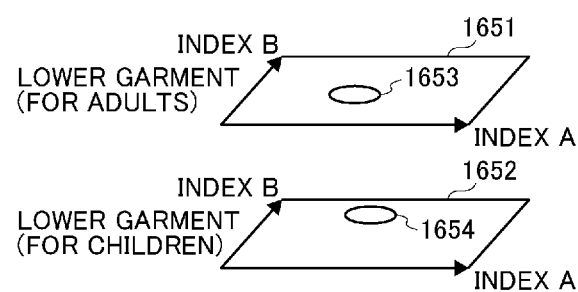

Furthermore, FIG. 16F illustrates an example in which the relationship of evaluation values among the optimally combinable articles has a dissimilar relationship in a two-dimensional plane 1641 for adults and a two-dimensional plane 1642 for children. The two-dimensional planes 1641 and 1642 are each defined by the index A and the index B.

FIG. 16F illustrates that, for example, a lower garment (for adults) having an evaluation value 1653 is combined with a lower garment (for children) having a dissimilar evaluation value 1654 to obtain an optimum combination.

<Details of Processing of Analysis Unit and Sales Image Generation Unit>

Figure 17:
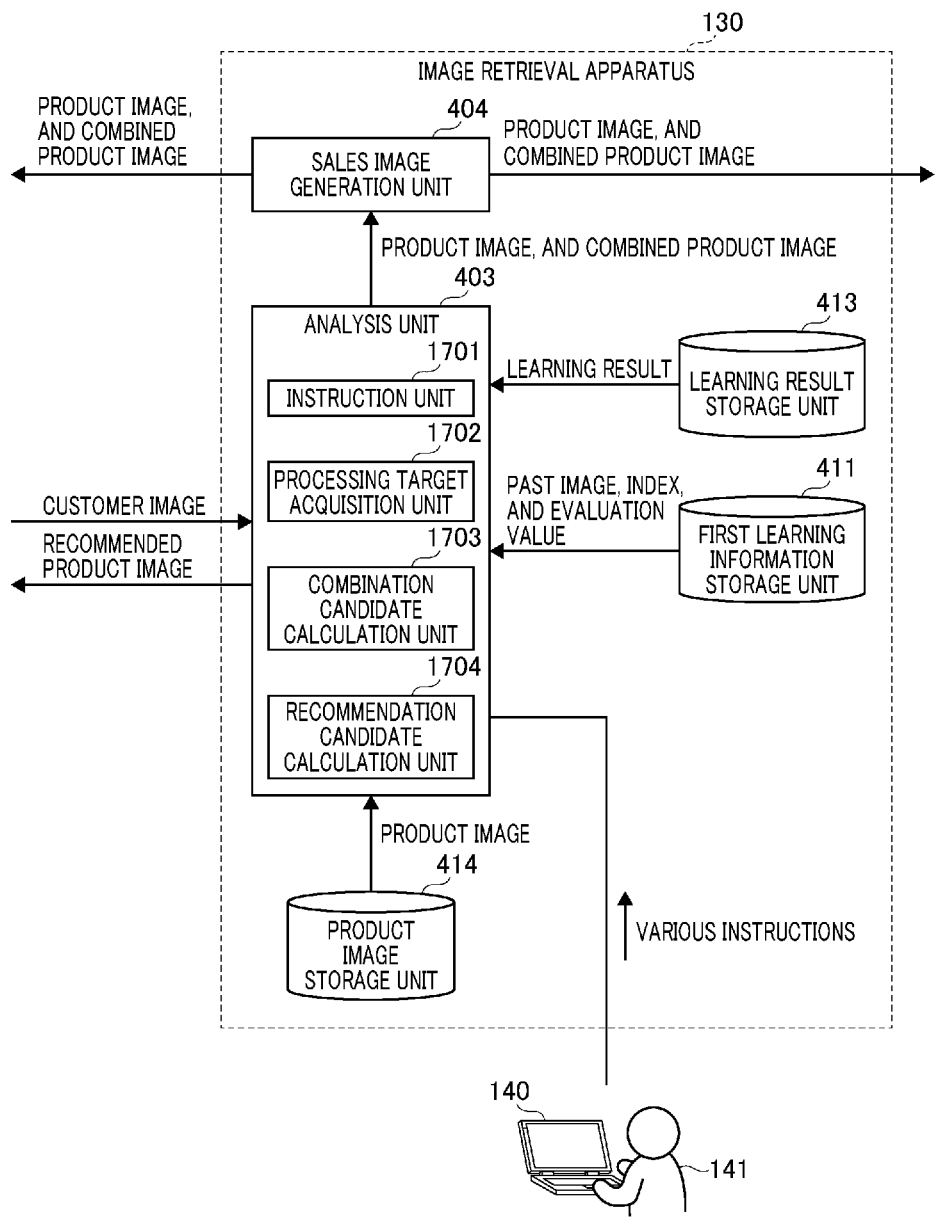
FIG. 17 is a diagram illustrating the details of a functional configuration of an analysis unit and a sales image generation unit of the image retrieval apparatus.

(1) Details of Functional Configuration of Analysis Unit and Sales Image Generation Unit Next, a functional configuration of the analysis unit 403 and the sales image generation unit 404 of the image retrieval apparatus 130 will be described. FIG. 17 is a diagram illustrating the details of a functional configuration of an analysis unit and a sales image generation unit of the image retrieval apparatus. As illustrated in FIG. 17, the analysis unit 403 includes an instruction unit 1701, a processing target acquisition unit 1702, a combination candidate calculation unit 1703, and a recommendation candidate calculation unit 1704.

The instruction unit 1701 provides various screens to the terminal 140 and receives various instructions from the terminal 140. The instruction unit 1701 includes, for example, an instruction to select a product image to be processed, an instruction to display a map containing the selected product image, and an instruction to retrieve an association image associated with the selected product image.

The instruction unit 1701 executes processing based on the received various instructions. For example, when receiving an instruction to select a product image as an image to be processed, the instruction unit 1701 reads the selected product image from the product image storage unit 414.

For example, in response to reception of an instruction to display a map including the selected product image, the instruction unit 1701 reads the past image from the first learning information storage unit 411, generates a map, and plots and displays the selected product image on the generated map.

For example, in response to reception of an instruction to retrieve an association image associated with the selected product image, the instruction unit 1701 notifies the processing target acquisition unit 1702 of the selected product image.

The processing target acquisition unit 1702 is an example of an acquisition unit, and acquires the image to be processed and notifies the combination candidate calculation unit 1703 or the recommendation candidate calculation unit 1704 of the acquired image. Specifically, in the execution phase, when the processing target acquisition unit 1702 acquires the selected product image from the instruction unit 1701 as an image to be processed, the processing target acquisition unit 1702 notifies the combination candidate calculation unit 1703 of the selected product image.

When a customer image is transmitted as an image to be processed from the server apparatus 120 in the individual support phase, the processing target acquisition unit 1702 notifies the recommendation candidate calculation unit 1704 of the customer image.

The combination candidate calculation unit 1703 is an example of a specifying unit. The combination candidate calculation unit 1703 reads the evaluation value learning result and the combination learning result stored in the learning result storage unit 413. The combination candidate calculation unit 1703 specifies an association image from the selected product image on the basis of the read evaluation value learning result and the combination learning result.

As a result, the seller 141 can photograph a fashion model wearing products (products included in the image to be processed and products included in the association image) that can be optimally combined, to generate a combined product image.

The combination candidate calculation unit 1703 acquires the generated combined product image and notifies the sales image generating unit 404 of the acquired combined product image. At this time, the combination candidate calculation unit 1703 reads the product image stored in the product image storage unit 414, and notifies the sales image generation unit 404 of the read product image and the combined product image.

The recommendation candidate calculation unit 1704 is another example of the specifying unit. The recommendation candidate calculation unit 1704 reads the evaluation value learning result and the combination learning result stored in the learning result storage unit 413. The recommendation candidate calculation unit 1704 specifies an association image from the customer image on the basis of the evaluation value learning result and the combination learning result that have been read.

Furthermore, the recommendation candidate calculation unit 1704 transmits the specified association image to the server apparatus 120 as a recommended product image.

Since the function of the sales image generation unit 404 has already been described with reference to FIG. 4, a description thereof is omitted here.

(2) Example of Display Screen Provided by Instruction Unit

Figure 18A:
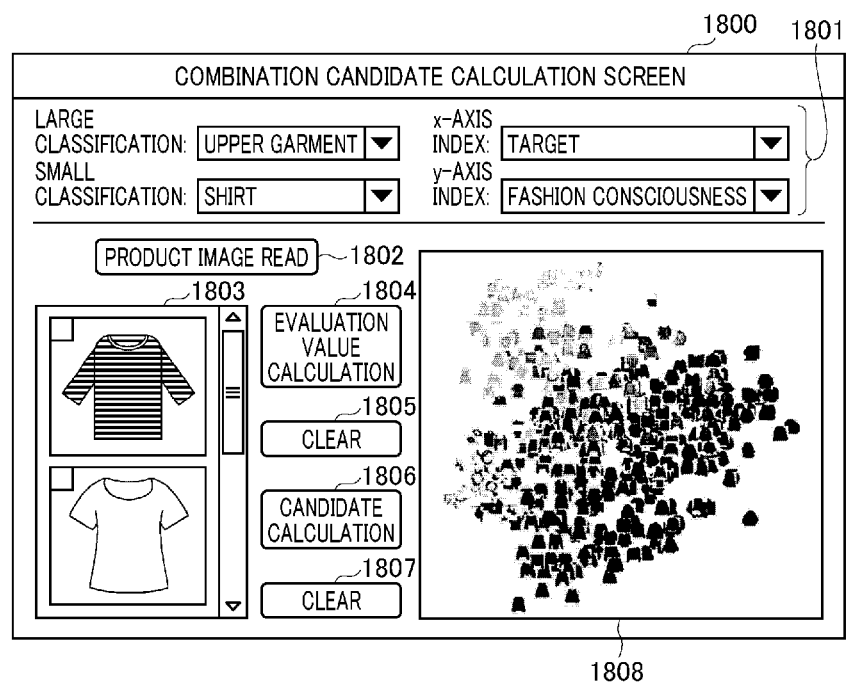
FIGS. 18A and 18B are views each illustrating an example of a combination candidate calculation screen.
Figure 18B:
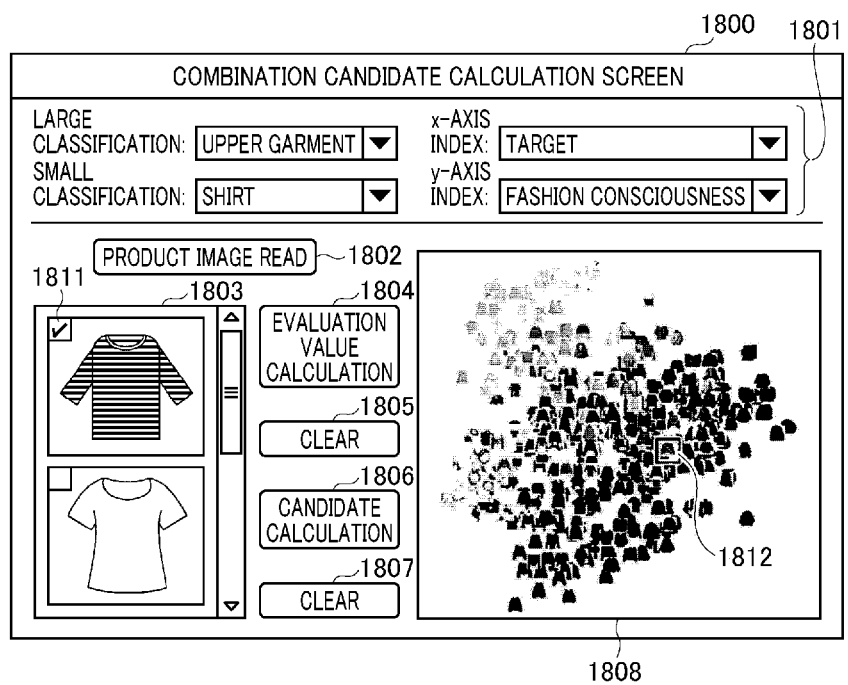

Next, an example of a display screen displayed on the terminal 140 by the instruction unit 1701 in the execution phase will be described. FIGS. 18A and 18B are views each illustrating an example of the combination candidate calculation screen.

When the instruction unit 1701 is activated, a combination candidate calculation screen 1800 is displayed on the terminal 140. As illustrated in FIG. 18A, the combination candidate calculation screen 1800 includes a condition designation area 1801.

The condition designation area 1801 includes an input field for inputting large and small classifications to which a product included in an image to be processed belongs. The condition designation area 1801 includes an input field for inputting an x-axis index and a y-axis index. The x-axis and the y-axis are used when a map is generated on the basis of past images of products belonging to the input large and small classifications.

When the large classification, the small classification, an x-axis index, and a y-axis index are input in the condition designation area 1801, the instruction unit 1701 reads past images of products belonging to the input large and small classifications. Thus, in a map display area 1808, a map in which the read past image is plotted on a two-dimensional plane defined by the input x-axis index and y-axis index is displayed.

The combination candidate calculation screen 1800 includes a product image read ("read product image") button 1802. When the product image read button 1802 is pressed, the instruction unit 1701 reads product images of products belonging to the large and small classifications input in the condition designation area 1801 from the product image storage unit 414 and displays the read product image in a product image display area 1803.

The combination candidate calculation screen 1800 in FIG. 18B indicates a state in which a check mark is input to a check area 1811 in order to select an image to be processed from the product images displayed in the product image display area 1803.

As illustrated in FIG. 18B, the combination candidate calculation screen 1800 includes an evaluation value calculation button 1804, a clear button 1805, a candidate calculation button 1806, and a clear button 1807. When the evaluation value calculation button 1804 is pressed while the check mark is input to the check area 1811, the evaluation value of the product included in the selected product image is calculated. Thus, in the map display area 1808, a map in which a selected product image 1812 (more specifically, a point representing the selected product image 1812) is plotted is displayed at a position determined by the calculated evaluation value.

Thus, the seller 141 can grasp the position of the products included in the selected product image in the map and recognize the evaluation value.

When the clear button 1805 is pressed on the combination candidate calculation screen 1800, the check mark input to the check area 1811 is cleared. The selected product image 1812 plotted in the map display area 1808 is cleared.

Figure 19A:
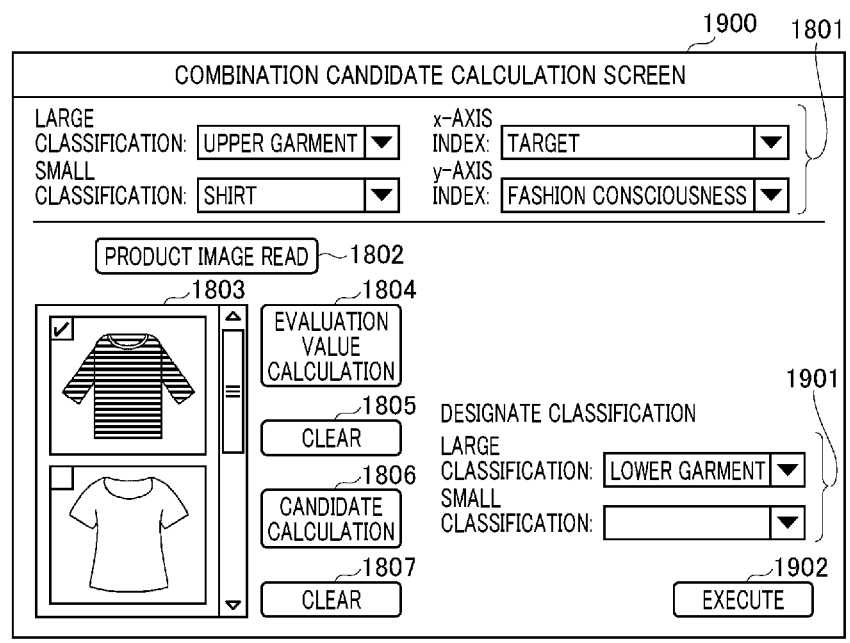
FIGS. 19A and 19B are views each illustrating an example of the combination candidate calculation screen and a combination candidate calculation result screen.
Figure 19B:
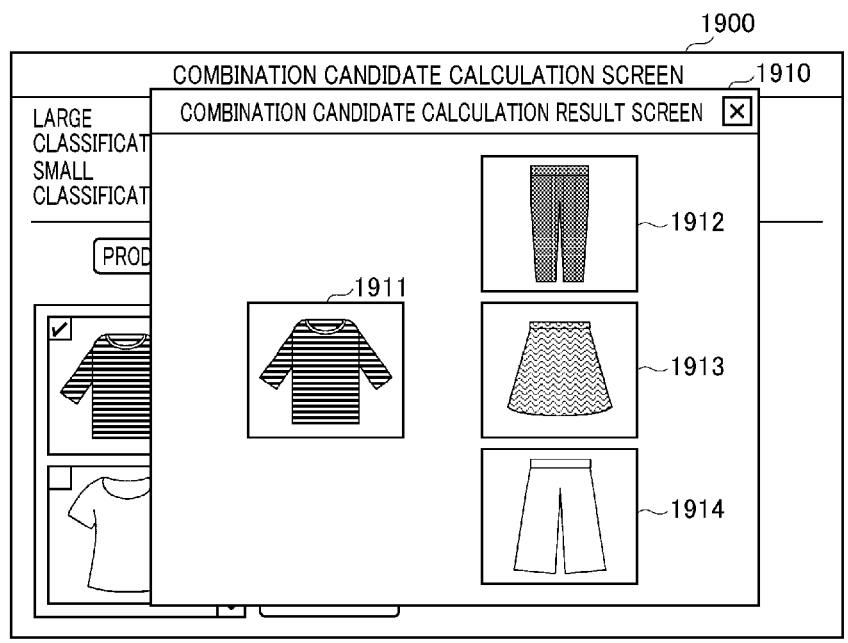

FIGS. 19A and 19B are views each illustrating an example of the combination candidate calculation screen and a combination candidate calculation result screen. When the candidate calculation button 1806 is pressed on the combination candidate calculation screen 1800 illustrated in FIG. 18B, as illustrated in FIG. 19A, a condition designation area 1901 for designating a large classification and a small classification used when specifying an association image from the selected product image is displayed.

In the condition designation area 1901 of a combination candidate calculation screen 1900, when the large classification and the small classification are input and an execution button 1902 is pressed, the association images of the products belonging to the designated large and small classifications are specified for the selected product image. As a result, the combination candidate calculation result screen 1910 illustrated in FIG. 19B is displayed.

As illustrated in FIG. 19B, the combination candidate calculation result screen 1910 includes a selected product image 1911 and specified association images 1912, 1913, and 1914.

(3) Example of Processing of Combination Candidate Calculation Unit

Figure 20:
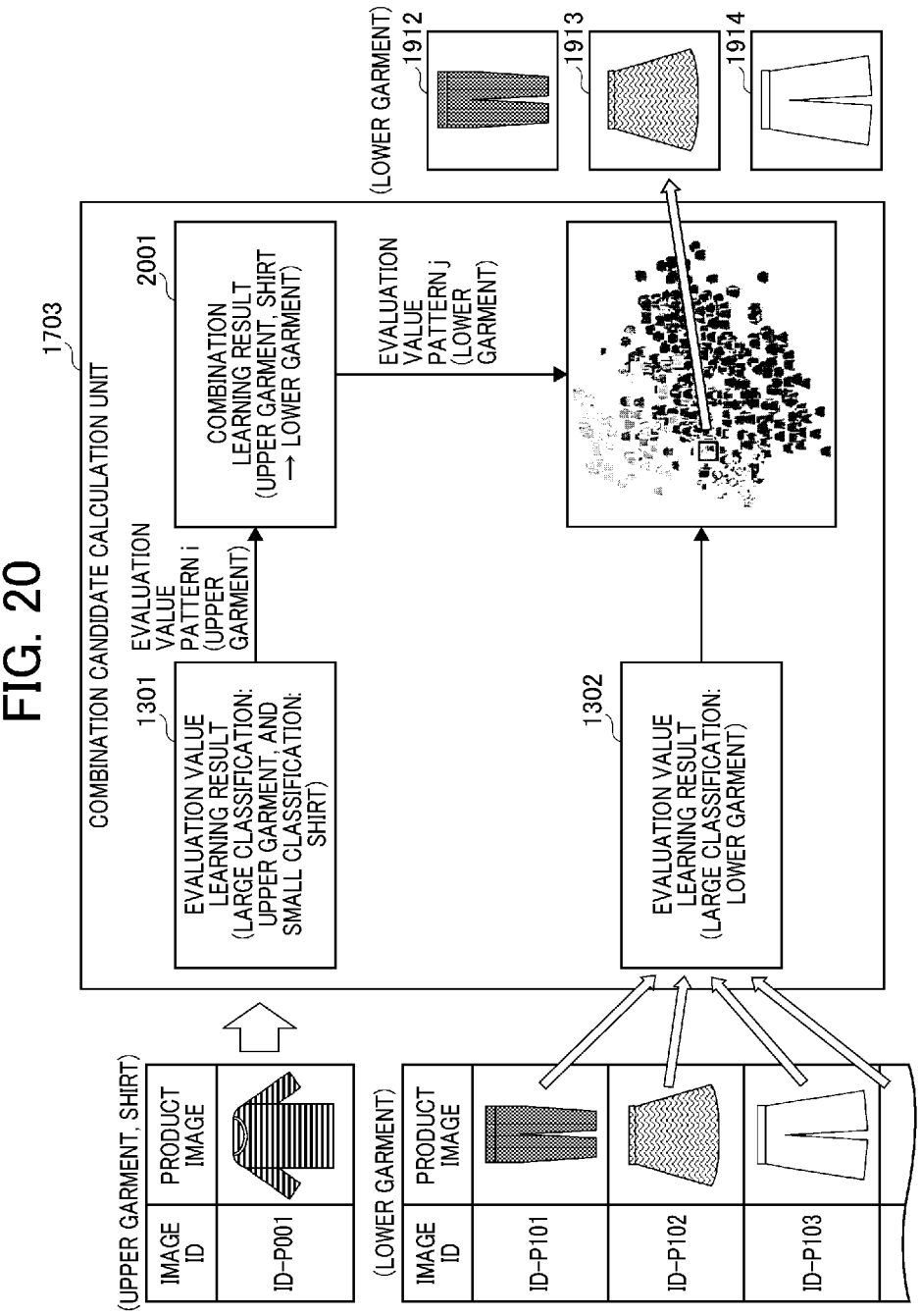
FIG. 20 is a view illustrating an example of processing of a combination candidate calculation unit.

Next, an example of processing of the combination candidate calculation unit 1703 will be described. FIG. 20 is a view illustrating a specific example of processing of a combination candidate calculation unit. As illustrated in FIG. 20, the combination candidate calculation unit 1703 reads the evaluation value learning result 1301 for the large and small classifications input in the condition designation area 1801 of the combination candidate calculation screen 1800 from the learning result storage unit 413.

The combination candidate calculation unit 1703 acquires a product image in which a check mark is input to the check area 1811 on the combination candidate calculation screen 1800. Furthermore, the combination candidate calculation unit 1703 inputs the read product image to the evaluation value learning result 1301 to calculate an evaluation value pattern i (for example, the evaluation value 1415 in FIG. 14B).

Furthermore, the combination candidate calculation unit 1703 uses the learning result storage unit 413 to read a combination learning result 2001 between: articles belonging to the large and small classifications designated when the product image read button 1802 is pressed in the condition designation area 1801 of the combination candidate calculation screen 1800; and articles belonging to the large and small classifications designated when the execution button 1902 is pressed in the condition designation area 1901 of the combination candidate calculation screen 1900.

Furthermore, the combination candidate calculation unit 1703 inputs the calculated product image to the combination learning result 2001 to calculate an evaluation value pattern j (for example, the evaluation value 1416 in FIG. 14B).

Further, the combination candidate calculation unit 1703 reads, from the product image storage unit 414, the product images of products belonging to the large and small classifications designated when the execution button 1902 is pressed on the combination candidate calculation screen 1900.

The combination candidate calculation unit 1703 reads from the learning result storage unit 413 the evaluation value learning result 1302 for calculating the evaluation value pattern of the read product images.

Furthermore, the combination candidate calculation unit 1703 inputs the read product image to the evaluation value learning result 1302 to calculate an evaluation value pattern. Furthermore, the combination candidate calculation unit 1703 plots the read product images on a map on the basis of the calculated evaluation value pattern. Thus, a map (for example, a two-dimensional plane 1412 in FIG. 14B) can be generated for the product images of the products belonging to the large and small classifications designated when the execution button 1902 is pressed.

The combination candidate calculation unit 1703 specifies the position of the evaluation value pattern j in the map by plotting the evaluation value pattern j calculated in the combination learning result 2001 to the generated map. Thus, the association images 1912 to 1914 having the evaluation value pattern corresponding to the evaluation value pattern j can be extracted.

(4) Example of Processing of Recommendation Candidate Calculation Unit

Figure 21:
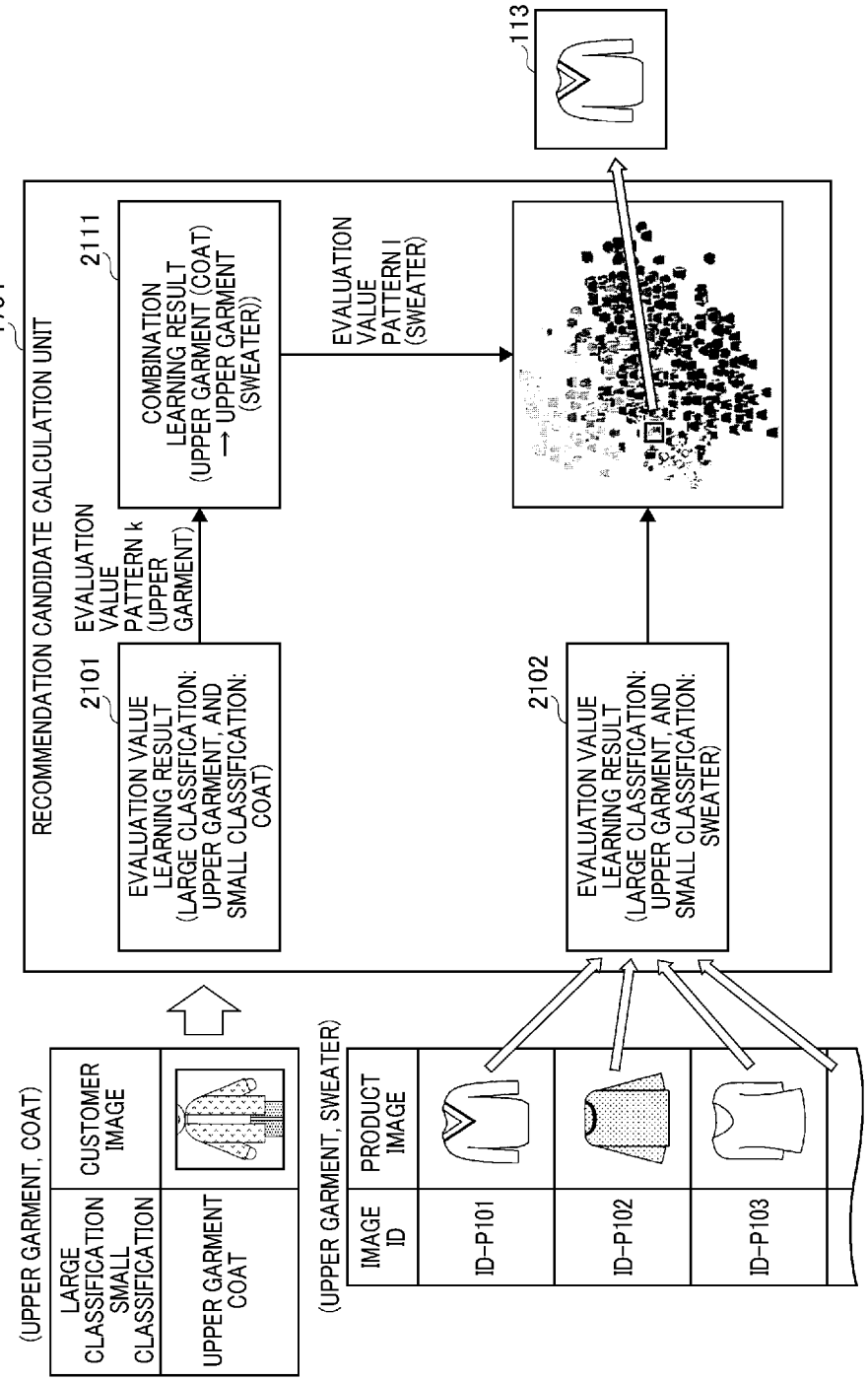
FIG. 21 is a view illustrating an example of processing of a recommendation candidate calculation unit.

Next, an example of processing of the recommendation candidate calculation unit 1704 will be described. FIG. 21 is a view illustrating a specific example of processing of a recommendation candidate calculation unit. As illustrated in FIG. 21, the recommendation candidate calculation unit 1704 reads, from the learning result storage unit 413, the evaluation value learning result 2101 for the large and small classifications designated for the customer image transmitted from the server apparatus 120.

Furthermore, the recommendation candidate calculation unit 1704 inputs the customer image to the read evaluation value learning result 2101 to calculate an evaluation value pattern k.

Further, the recommendation candidate calculation unit 1704 uses the learning result storage unit 413 to read a combination learning result 2111 between: articles belonging to the same large and small classifications as the articles included in the customer image and transmitted in association with the customer image; and articles belonging to the large and small classifications of recommended products, the articles being transmitted in association with the customer image.

The recommendation candidate calculation unit 1704 inputs the calculated evaluation value pattern k to the read combination learning result 2111 to calculate an evaluation value pattern l.

Further, the recommendation candidate calculation unit 1704 reads, from the product image storage unit 414, the product images of products belonging to the large and small classifications of the recommended products transmitted in association with the customer image.

Further, the recommendation candidate calculation unit 1704 reads, from the learning result storage unit 413, the evaluation value learning result 2102 for the large and small classifications of the recommended products transmitted in association with the customer image.

Further, the recommendation candidate calculation unit 1704 inputs, to the evaluation value learning result 2102, the product images of products belonging to the large and small classifications of the recommended products transmitted in association with the customer image, to calculate an evaluation value pattern. Furthermore, the recommendation candidate calculation unit 1704 plots, on the map, the product images of products belonging to the large and small classifications of the recommended products transmitted in association with the customer image, on the basis of the calculated evaluation value pattern.

The recommendation candidate calculation unit 1704 specifies the position of the evaluation value pattern 1 in the map by plotting the evaluation value pattern 1 calculated in the combination learning result 2111 to the generated map. Thus, the association image having the evaluation value pattern corresponding to the evaluation value pattern 1 can be extracted.

The recommendation candidate calculation unit 1704 transmits the extracted association image to the server apparatus 120 as the recommended product image 113.

(5) Flow of Analysis Processing by Analysis Unit (Execution Phase, and Individual Support Phase)

Figure 22:
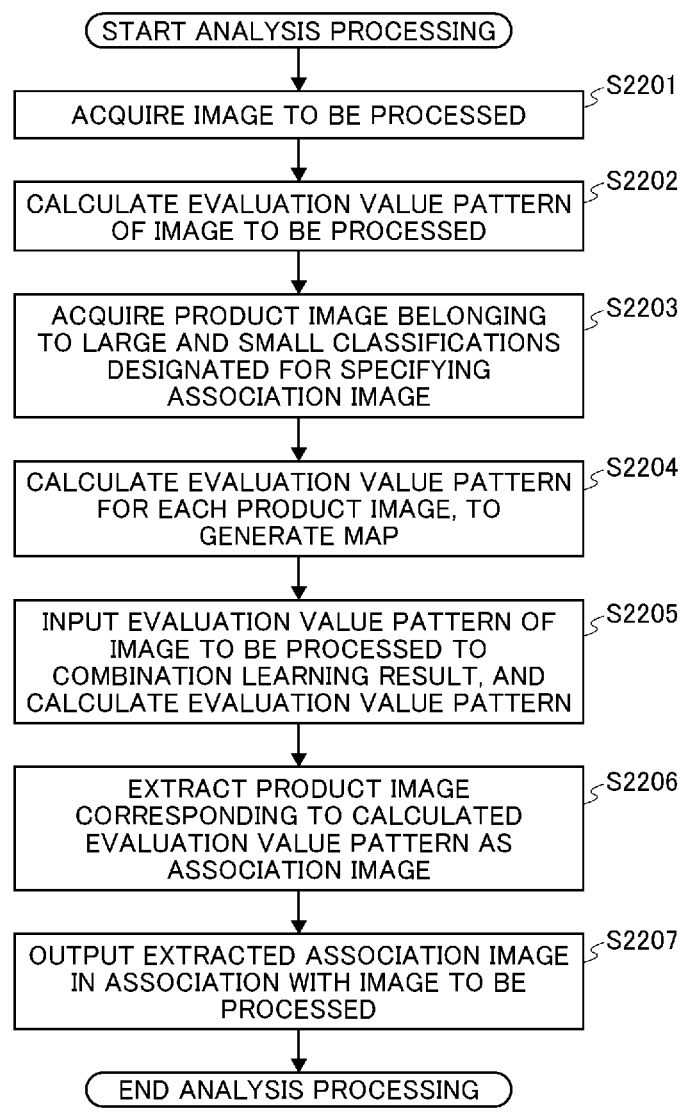
FIG. 22 is a flowchart illustrating a flow of analysis processing by the analysis unit of the image retrieval apparatus.

Next, the flow of the analysis processing by the analysis unit 403 will be described. FIG. 22 is a flowchart illustrating a flow of analysis processing by the analysis unit of the image retrieval apparatus.

In step S2201, the analysis unit 403 acquires an image to be processed (selected product or customer Image).

In step S2202, the analysis unit 403 calculates an evaluation value pattern of the image to be processed.

In step S2203, the analysis unit 403 acquires product images of products belonging to the large and small classifications (large and small classifications designated by the seller 141 or large and small classifications of recommended products designated by customer 111) designated for specifying an association image.

In step S2204, the analysis unit 403 calculates an evaluation value pattern of the product images acquired in step S2203, to generate a map.

In step S2205, the analysis unit 403 inputs the evaluation value pattern of the image to be processed to the combination learning result, and calculates an evaluation value pattern corresponding to the evaluation value pattern of the image to be processed.

In step S2206, the analysis unit 403 determines a product image corresponding to the evaluation value pattern calculated in step S2205, on the basis of the map generated in step S2204, and extracts the product image as an association image.

In step S2207, the analysis unit 403 outputs the extracted association image in association with the image to be processed.

(6) Example of Processing of Sales Image Generation Unit

Figure 23A:
FIGS. 23A and 23B are views each illustrating an example of processing of the sales image generation unit.
Figure 23B:
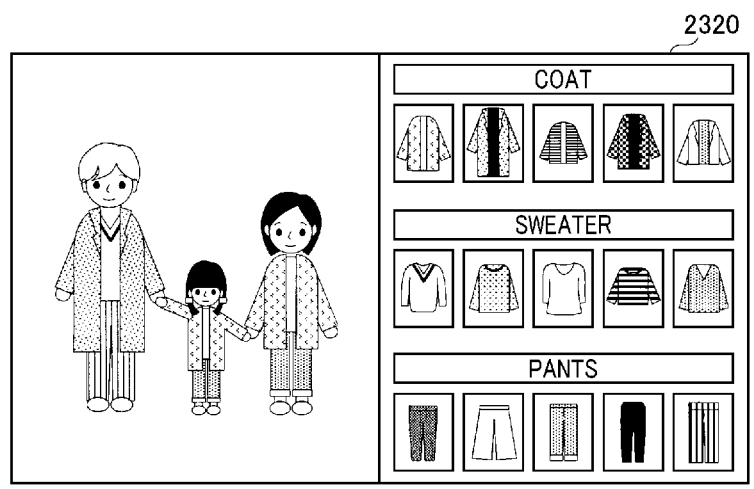

Next, an example of processing of the sales image generation unit 404 will be described. FIGS. 23A and 23B are views each illustrating a specific example of processing of the sales image generation unit. As described above, the sales image generation unit 404 generates a sales image using the product image and the combined product image notified from the analysis unit 403.

FIG. 23A is an example of a sales image including the product image and the combined product image notified from the analysis unit 403. As illustrated in FIG. 23A, a sales image 2310 generated by the sales image generation unit 404 includes an area including the combined product image and an area including the product image.

FIG. 23B is another example of a sales image including the product image and the combined product image notified from the analysis unit 403. As illustrated in FIG. 23B, a sales image 2320 generated by the sales image generation unit 404 includes an area including the combined product image and an area including the product image.

<Details of Processing of Server Apparatus>

Next, the processing executed by the server apparatus 120 will be described in detail.

(1) Example of Display Screen Provided by Server Apparatus

Figure 24A:
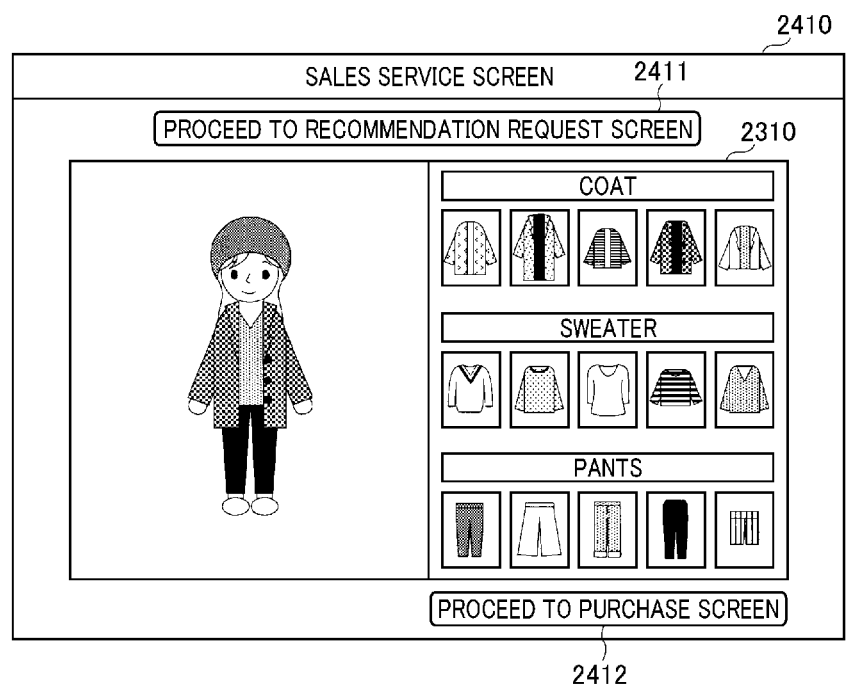
FIGS. 24A and 24B are views each illustrating an example of a display screen provided by a server apparatus.
Figure 24B:
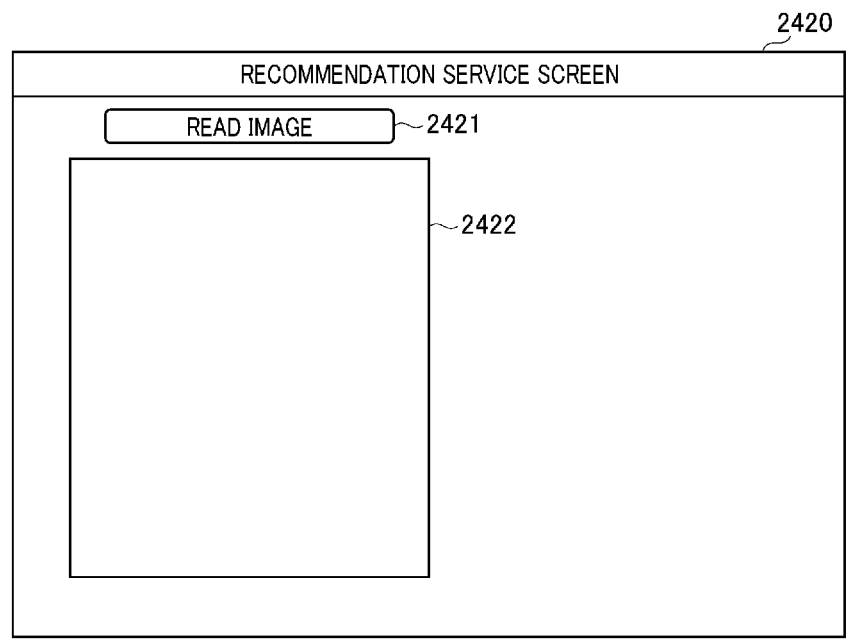

First, an example of a display screen provided to the mobile terminal 110 by the server apparatus 120 at the time of providing a sales service will be described. FIGS. 24A and 24B are views each illustrating an example of the display screen provided by the server apparatus.

FIG. 24A illustrates an example of a sales service screen 2410 displayed when the mobile terminal 110 accesses the server apparatus 120. As illustrated in FIG. 24A, the sales service screen 2410 includes the sales image 2310 generated by the sales image generation unit 404. The sales service screen 2410 includes a "proceed to a recommendation request screen" button 2411 and a "proceed to a purchase screen" button 2412. A screen transition in a case where the "proceed to a recommendation request screen" button 2411 is pressed will be described below.

When the "proceed to a recommendation request screen" button 2411 is pressed, a transition is made to a recommendation service screen 2420 illustrated in FIG. 24B. As illustrated in FIG. 24B, the recommendation service screen 2420 includes a display area 2422 for a customer image. By pressing a "read an image" button 2421, the customer 111 reads an image, and thus the image is displayed in the display area 2422 for a customer image (see FIGS. 25A and 25B).

Figure 25A:
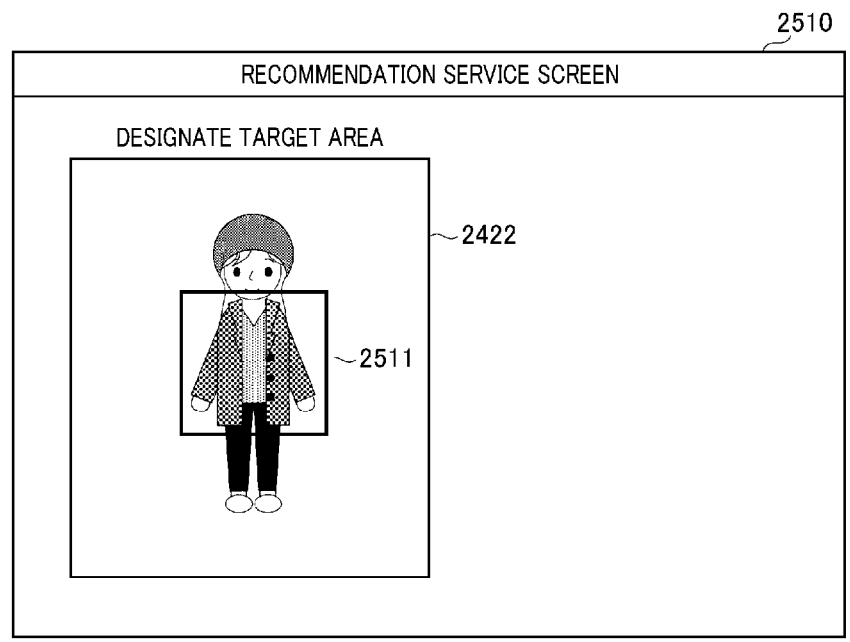
FIGS. 25A and 25B are views illustrating an example of the display screen provided by the server apparatus.
Figure 25B:
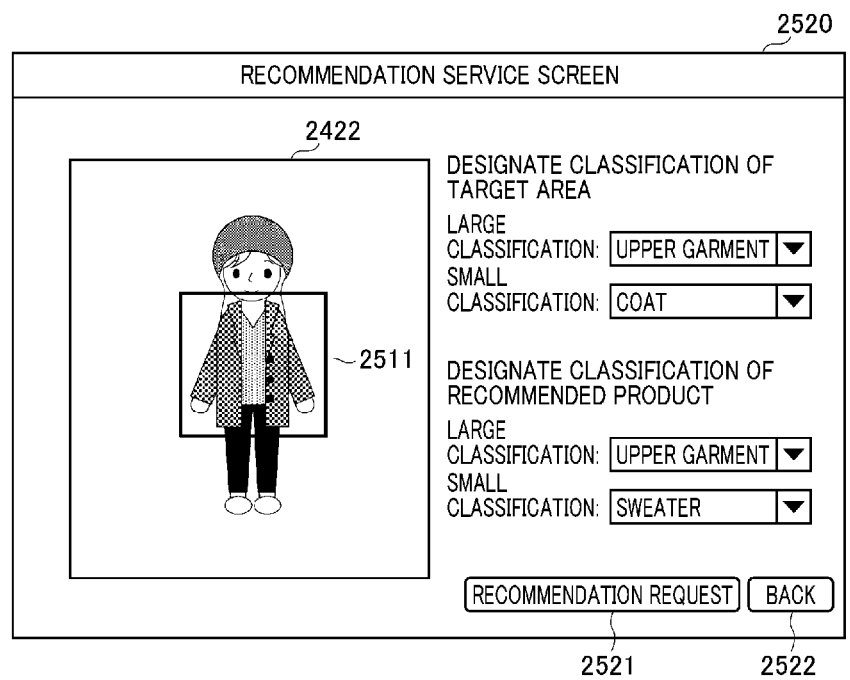

FIGS. 25A and 25B are views each illustrating an example of the display screen provided by the server apparatus. As illustrated in FIGS. 25A and 25B, when the image is displayed in the display area 2422 for a customer image, a predetermined message ("designate a target area") is displayed on a recommendation service screen 2510. In response to this, the customer 111 designates an area of predetermined articles included in the customer image 112 as a target area 2511. Although the example of FIG. 25A illustrates a case where the customer 111 designates the target area 2511. The target area 2511 may be automatically extracted. When the target area 2511 is automatically extracted, any existing image processing technique is assumed to be used.

Upon completion of the designation of the target area 2511 by the customer 111, transition is made to a recommendation service screen 2520 illustrated in FIG. 25B. As illustrated in FIG. 25B, the recommendation service screen 2520 includes an input field for inputting large and small classifications of articles included in the target area 2511. In addition, the recommendation service screen 2520 includes an input field for inputting the large and the small classifications of recommended products. The example in FIG. 25B illustrates a case where the customer 111 inputs the large and small classifications of the articles included in the target area 2511, and inputs the large and small classifications of the recommended products. However, these inputs may be automatically performed instead of being performed by the customer 111. It should be noted that any existing image recognition technology is used for automatic input of the large and small classifications of the articles included in the target area 2511, and the large and small classifications of the recommended products.

The example of FIG. 25B illustrates that "Upper garment" is designated as the large classification of the articles included in the target area 2511, and "Coat" is designated as the small classification. The example in FIG. 25B illustrates that "Upper garment" is designated as the large classification of the recommended product and "Sweater" is designated as the small classification.

The recommendation service screen 2520 further includes a "recommendation request" button 2521 and a "back" button 2522. When the "recommendation request" button 2521 is pressed, various types of information are transmitted to the server apparatus 120. Examples of such information to be transmitted include: a customer image (also including information indicating the target area 2511) displayed in the display area 2422 of the customer image; information about the large and small classifications of the articles included in the target area 2511 of the customer image; and information about the large and small classifications of recommended products.

When the "back" button 2522 is pressed, for example, the screen returns to the recommendation service screen 2420.

In response to reception of the customer information, information regarding the large and small classifications of the articles included in the target area 2511, and information regarding the large and small classifications of the recommended products, the server apparatus 120 transmits these pieces of information to the image retrieval apparatus 130. As a result, in the server apparatus 120, the recommended product image is received from the image retrieval apparatus 130 and a recommended product screen 2610 is displayed.

Figure 26:
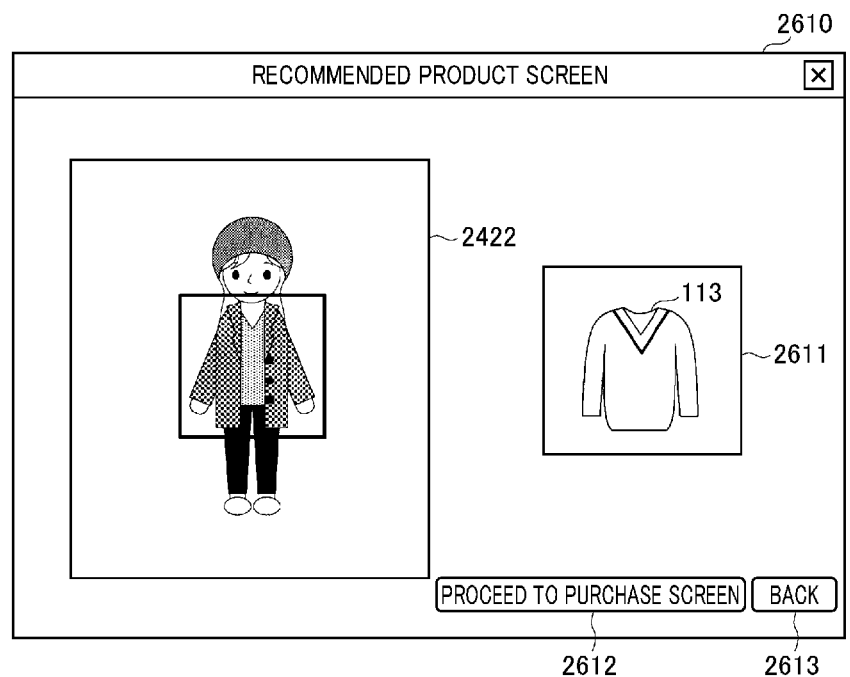
FIG. 26 is a view illustrating an example of the display screen provided by the server apparatus.

FIG. 26 is a view illustrating an example of the display screen provided by the server apparatus. As illustrated in FIG. 26, the recommended product screen 2610 includes the display area 2422 for a customer image and a display area 2611 for a recommended product image. In the display area 2611 of the recommended product image, the recommended product image 113 is displayed. Although the example of FIG. 26 illustrates a case where only one recommended product image 113 is displayed, a plurality of recommended product images may be displayed. Further, in FIG. 25B, when the classification of recommended product is not designated by the customer 111, recommended product images in all classifications may be displayed.

The recommended product screen 2610 further includes a "proceed to a purchase screen" button 2612 and a "back" button 2613. When the customer 111 desires to purchase the product specified by the recommended product image 113, the customer presses the "proceed to a purchase screen" button 2612. On the other hand, when the customer 111 does not desire to purchase the product specified by the recommended product image 113, the customer presses the "back" button 2613.

(2) Recommendation Service Providing Processing by Server Apparatus

Figure 27:
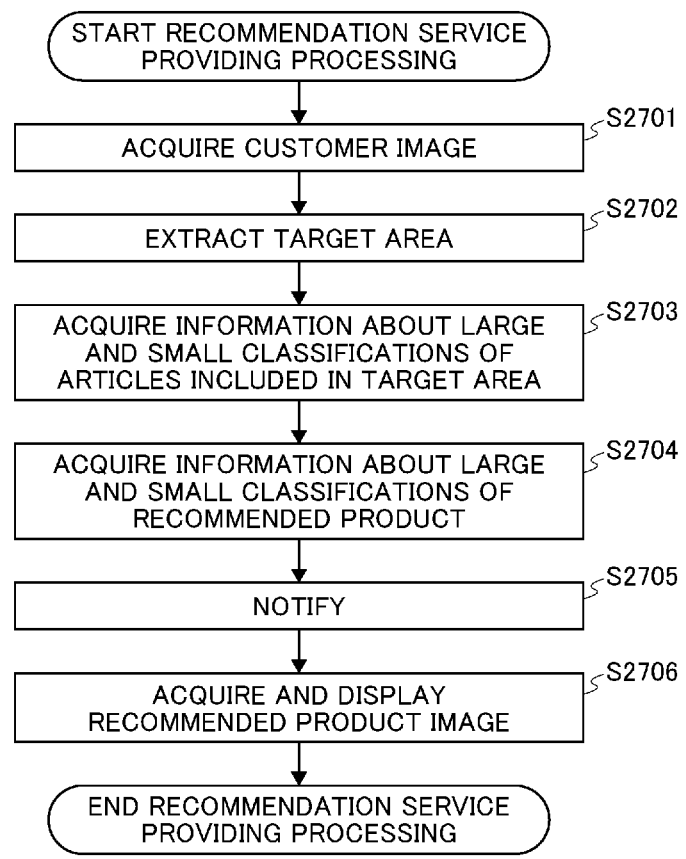
FIG. 27 is a flowchart illustrating a flow of recommendation service providing processing by the server apparatus.

Next, a flow of recommendation service providing processing by the server apparatus 120 will be described. FIG. 27 is a flowchart illustrating a flow of recommendation service providing processing by the server apparatus.

In step S2701, the server apparatus 120 acquires a customer image transmitted from the mobile terminal 110.

In step S2702, the server apparatus 120 extracts a target area specified in the customer image.

In step S2703, the server apparatus 120 acquires information about large and small classifications of articles included in the target area.

In step S2704, the server apparatus 120 acquires information about large and small classifications of recommended products.

In step S2705, the server apparatus 120 notifies the image retrieval apparatus 130 of a target area extracted from the customer image, information on the large and small classifications of the articles included in the target area, and information on the large and small classifications of the recommended products.

In step S2706, the server apparatus 120 acquires a recommended product image from the image retrieval apparatus 130 and displays the image on the mobile terminal 110.

As described above, the image retrieval apparatus according to the first embodiment performs the following processing, for example.

Firstly, a combination learning result is obtained by learning the relationship of evaluation values among articles that belong to different categories and can be optimally combined.

Secondly, evaluation values calculated for articles included in an image to be processed are input into a combination learning result, and evaluation values of products that are each in a category different from the articles included in the image to be processed and can be optimally combined for the articles included in the image to be processed are calculated.

Thirdly, a product image of at least one product having the calculated evaluation value is output as an association image in association with the image to be processed.

Thus, according to the image retrieval apparatus according to the first embodiment, it is possible to recommend a product having a category different from that of an article included in the image to be processed, and is optimally combined for the article included in the image to be processed.

Second Embodiment

In the first embodiment, a case where images to be processed are designated one by one on the combination candidate calculation screen 1800 has been described. However, the plurality of images to be processed may be specified at the same time.

Further, the above described first embodiment has described that, in the combination candidate calculation screen 1900, products that are the most suitable combination for the products included in the image to be processed are designated for one category. However, products that are the most suitable combination for the products included in the image to be processed may be designated for a plurality of categories.

Further, the above described first embodiment has described that, in the combination candidate calculation screen 1900, large and small classifications of products that are to be combined with the products included in the image to be processed are designated. However, the items to be specified in the condition designation area 1901 are not limited to the large and small classifications, and may be configured so that items such as "For adults" and "For children" can be specified.

With enhanced operability of the combination candidate calculation screen, the seller 141 can more easily retrieve various combinations of products.

Third Embodiment

In the first and second embodiments, FIGS. 18A and 18B and FIGS. 19A and 19B are exemplified, and various functions performed by the analysis unit 403 via the combination candidate calculation screen are described. However, the functions performed by the analysis unit 403 via the combination candidate calculation screen are not limited to those illustrated in FIGS. 18A and 18B and FIGS. 19A and 19B.

For example, a print output unit may be provided in the analysis unit 403, which executes a print output operation via the combination candidate calculation screen. In one example, the operation includes reading product images of products belonging to the large classification (Upper garment) and the small classification (Shirt) input in the condition designation area 1801 from the product image storage unit 414, calculating all the evaluation values of the products included in each product image to generate a map (first map), and printing out the map. In another example, the operation includes reading product images of products belonging to the large classification (Lower garment) input in the condition designation area 1901 from the product image storage unit 414, calculating all the evaluation values of the products included in each product image to generate a map (second map), and printing out the map.

Assuming that both of the operations are performed, one of the maps printed out by the above-described operations may be printed out on a clear film as a print medium, for example. As a result, the two maps can be viewed on top of each other.

In addition, on the map printed out through the above two operations, the selected product image 1812 and the association images 1912, 1913, and 1914 may be clearly indicated. As a result, the seller 141 can confirm a relationship between the product image 1812 and the association images 1912, 1913, and 1914 while browsing a plurality of maps in an overlapping manner. As a result, the seller 141 can generate the combined product image 132 used for the product catalog 151 after considering other association images.

Variations

In the first embodiment described above, although it has been described that the evaluation value learning unit 1101 and the combination learning unit 1102 are configured by a convolution neural network, the configurations of the evaluation value learning unit 1101 and the combination learning unit 1102 are not limited thereto. The evaluation value learning unit 1101 only needs to have a learning function of appropriately outputting, from the image to be processed, an evaluation value pattern of an article included in the image to be processed. The combination learning unit 1102 only needs to have a learning function of outputting an evaluation value of articles that can be optimally combined, from an evaluation value of articles included in an image to be processed.

In the first embodiment, the server apparatus 120 and the image retrieval apparatus 130 are configured separately, but the server apparatus 120 and the image retrieval apparatus 130 may be configured integrally. It is also possible to implement a part of the functions of the image retrieval apparatus 130, in the server apparatus 120.

In the first embodiment, the image retrieval apparatus 130 has each storage unit (the first learning information storage unit 411, the second learning information storage unit 412, the learning result storage unit 413, and the product image storage unit 414). However, each storage unit may be provided by an external device separate from the image retrieval apparatus 130.

In the first embodiment, the sales system 100 is formed. In the sales system 100, the image retrieval apparatus 130 is connected to the server apparatus 120 and the printing apparatus 150, a sales service is provided to the customer 111 through the server apparatus 120, and a product catalog is provided through the printing apparatus 150. However, the system having the image retrieval apparatus 130 is not limited to this, and a system providing one of the sales service and the product catalog (for example, a product catalog generation system providing the product catalog through the printing apparatus 150) may be formed.

It is to be noted that the present invention is not limited to the configuration described here, such as a combination with other elements in the configuration mentioned in the above embodiment. These points may be changed without departing from the spirit and scope of the present invention, and may be appropriately determined in accordance with the application form thereof.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application No. 2018-101852, filed on May 28, 2018, in the Japan Patent Office, the entire disclosure of which is hereby incorporated by reference herein.

REFERENCE SIGNS LIST

100 Sales system
110 Mobile terminal
120 Server apparatus
130 Image retrieval apparatus
140 Terminal
150 Printing apparatus
112 Customer image
113 Recommended product image
132 Combined product image
401 Information acquisition unit
402 Learning unit
403 Analysis unit
404 Image generation unit
501 Image information acquisition unit
502 Evaluation value input unit
503 Map generation unit
600 First learning information
800 Second learning information
900 Second learning information
1000 Product image information
1101 Evaluation value learning unit
1102 Combination learning unit
1701 Instruction unit
1702 Processing target acquisition unit
1703 Combination candidate calculation unit
1704 Recommendation candidate calculation unit
1800, 1900 Combination candidate calculation screen
1910 Combination candidate calculation result screen
2410 Sales service screen
2420 Recommendation service screen
2610 Recommended product screen

The invention claimed is:

1. An image retrieval apparatus, comprising:
processing circuitry configured to
acquire a digital image to be processed, the digital image to be processed including at least one article, and
specify, as an association image to be associated with the digital image to be processed, a product image of a product having an evaluation value that has a predetermined relationship with an evaluation value of the article included in the digital image to be processed, from among product images of a plurality of products each belonging to a particular category, the particular category being different from a category to which the article included in the digital image to be processed belongs; and
print output circuitry configured to print out a first map in which a product image of a product belonging to the same category as the category to which the article included in the digital image to be processed belongs is plotted at a position corresponding to an evaluation value of the product, and a second map in which a product image of a product belonging to the particular category is plotted at a position corresponding to an evaluation value of the product.

2. The image retrieval apparatus according to claim 1, wherein
the processing circuitry is further configured to plot the digital image to be processed on a map at a position determined by the evaluation value of the product of the product image on the map,
the map having plotted images of one or more products belonging to a same category as the category to which the article included in the digital image to be processed belongs.

3. The image retrieval apparatus according to claim 2, wherein the map has a coordinate system defined by two different indices selected from a plurality of indices.

4. The image retrieval apparatus according to claim 1, wherein the processing circuitry is further configured to:

acquire an evaluation value learning result obtained by learning a relationship between a past image of a product belonging to a first category that is the same as the category to which the product belongs and an evaluation value of the product, and calculate an evaluation value of the article included in the digital image to be processed using the acquired evaluation value leaning result; and acquire an evaluation value learning result obtained by learning a relationship between a past image of a product belonging to a second category different from the category to which the product belongs and an evaluation value of the product, and calculate an evaluation value of a product included in the product image using the acquired evaluation value learning result.

5. The image retrieval apparatus according to claim 4, wherein the processing circuitry is further configured to:

using a reference image including an article belonging to the first category and an article belonging to the second category, acquire a combination learning result obtained by learning a relationship between an evaluation value of the article belonging to the first category included in the reference image and an evaluation value of the article belonging to the second category included in the reference image, and specify the association image using the acquired combination learning result.

6. The image retrieval apparatus according to claim 1, wherein the processing circuitry is further configured to acquire any one of the plurality of product images as the digital image to be processed.

7. The image retrieval apparatus according to claim 1, wherein the predetermined relationship indicates that the evaluation value of the product image and the evaluation value of the article included in the digital image to be processed are optimally combinable.

8. The image retrieval apparatus according to claim 1, wherein the processing circuitry is further configured to acquire a part of a customer image transmitted from a customer terminal as the digital image to be processed.

9. The image retrieval apparatus according to claim 1, wherein the processing circuitry is further configured to determine the particular category according to a category that is input.

10. The image retrieval apparatus according to claim 1, wherein the print output circuitry is further configured to designate a clear film as a recording medium on which one of the first map and the second map is printed.

11. A product catalog generation system, comprising:
the image retrieval apparatus of claim 1; and
a printing apparatus configured to print out a sales image including the digital image to be processed and the specified association image, as a product catalog.

12. An image retrieval method comprising:
acquiring a digital image to be processed, the digital image to be processed including at least one article;
specifying, as an association image, a product image of a product having an evaluation value that has a predetermined relationship with an evaluation value of the article included in the digital image to be processed, from among product images of a plurality of products each belonging to a particular category, the particular category being different from a category to which the article included in the digital image to be processed belongs;
outputting the digital image to be processed and the specified association image in association with each other; and
printing out a first map in which a product image of a product belonging to the same category as the category to which the article included in the digital image to be processed belongs is plotted at a position corresponding to an evaluation value of the product, and a second map in which a product image of a product belonging to the particular category is plotted at a position corresponding to an evaluation value of the product.

13. A non-transitory computer-readable recording medium storing computer readable code that, when executed by processing circuitry, causes the processing circuitry to perform a method, comprising:
acquiring a digital image to be processed, the digital image to be processed including at least one article;
specifying, as an association image, a product image of a product having an evaluation value that has a predetermined relationship with an evaluation value of the article included in the digital image to be processed, from among product images of a plurality of products each belonging to a particular category, the particular category being different from a category to which the article included in the digital image to be processed belongs;
outputting the digital image to be processed and the specified association image in association with each other; and
printing out a first map in which a product image of a product belonging to the same category as the category to which the article included in the digital image to be processed belongs is plotted at a position corresponding to an evaluation value of the product, and a second map in which a product image of a product belonging to the particular category is plotted at a position corresponding to an evaluation value of the product.

* * * * *